(12) United States Patent
Caltenco et al.

(10) Patent No.: US 12,141,318 B2
(45) Date of Patent: Nov. 12, 2024

(54) TECHNIQUES FOR PRIVATE AND SECURE COLLECTION AND PROCESSING OF DATA FOR GENERALIZED ANALYSIS

(71) Applicant: TELEFONAKTIEBOLAGET LM ERICSSON (PUBL), Stockholm (SE)

(72) Inventors: Héctor Caltenco, Oxie (SE); Paul McLachlan, San Francisco, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 17/779,930

(22) PCT Filed: Nov. 26, 2019

(86) PCT No.: PCT/IB2019/060182
§ 371 (c)(1),
(2) Date: May 25, 2022

(87) PCT Pub. No.: WO2021/105746
PCT Pub. Date: Jun. 3, 2021

(65) Prior Publication Data
US 2023/0009067 A1    Jan. 12, 2023

(51) Int. Cl.
*G06F 21/62* (2013.01)
*G16Y 20/40* (2020.01)

(52) U.S. Cl.
CPC .......... *G06F 21/6245* (2013.01); *G16Y 20/40* (2020.01); *G06F 2221/2143* (2013.01)

(58) Field of Classification Search
CPC ................................................. G06F 21/6245
See application file for complete search history.

(56) References Cited

U.S. PATENT DOCUMENTS 9,838,204 B2    12/2017  Schultz et al.
9,923,881 B2     3/2018  Smith et al.
(Continued)

FOREIGN PATENT DOCUMENTS

CN          109672750 A      4/2019

OTHER PUBLICATIONS

L. Lyu et al., "Fog-Embedded Deep Learning for the Internet of Things", IEEE Transactions on Industrial Informatics, vol. 15, No. 7, doi: 10.1109/TII.2019.2912465, Jul. 2019.
(Continued)

*Primary Examiner* — Simon P Kanaan
(74) *Attorney, Agent, or Firm* — Sage Patent Group

(57) ABSTRACT

The present disclosure relates to techniques for collection and processing of data over a network, and in particular to in providing generalized analysis for preserving privacy of data sources. In some embodiments, a system receives a request for analytical data made by a requester, wherein the request includes: information for identifying one or more data source devices to be queried for input data, a type of data processing to be performed on the input data for generating the analytical data, and a data type for the analytical data. In response to receiving the request, the system causes the one or more data source devices to be queried for the input data. The system causes a response that includes the analytical data to be sent to the requester. Other embodiments are described throughout the present disclosure.

20 Claims, 15 Drawing Sheets

(56) References Cited

U.S. PATENT DOCUMENTS

| | | |
|---|---|---|
| 10,083,291 B2 | 9/2018 | James et al. |
| 10,192,069 B2 | 1/2019 | Nerurkar et al. |
| 10,223,547 B2 | 3/2019 | Rane et al. |
| 10,242,224 B2 | 3/2019 | Nerurkar et al. |
| 10,366,249 B2 | 7/2019 | Chen et al. |
| 10,390,220 B2 | 8/2019 | Joy |
| 2014/0075004 A1* | 3/2014 | Van Dusen ............ G07C 13/00 709/223 |
| 2017/0293772 A1 | 10/2017 | Chen et al. |
| 2018/0239925 A1 | 8/2018 | Nerurkar et al. |
| 2018/0349384 A1 | 12/2018 | Nerurkar et al. |
| 2019/0044732 A1 | 2/2019 | Reinders et al. |
| 2019/0057224 A1 | 2/2019 | Zhang et al. |
| 2019/0205561 A1 | 7/2019 | Sierra et al. |
| 2020/0251111 A1* | 8/2020 | Temkin ............... G06F 16/2423 |
| 2022/0239648 A1* | 7/2022 | Ramachandran ... H04L 63/0876 |
| 2022/0337611 A1* | 10/2022 | Brazao .................. G16Y 20/20 |

OTHER PUBLICATIONS

P. Rostrup, "A Distributed-to-Centralized Architectural Model for Smart City Applications and Services through Container Orchestration", Master's thesis in Master of Science in Informatics, NTNU—Norwegian University of Science and Technology, Jun. 2019.

S. Bennati et al, "Privacy-enhancing Aggregation of Internet of Things Data via Sensors Grouping", arXiv, Elsevier, Sep. 17, 2018.

* cited by examiner

IoT Device Data ⌒ 602

```
<message from='device@example.org'
  to='client@example.org/amr'>
  <fields xmlns='urn:xmpp:iot:sensordata' seqnr='1' done='true'>
   <node nodeId='Device01'>
     <latitude value='37.7865N'>
     <longitude value='122.4000W'>
    <timestamp value='2019-03-07T16:24:30'>
      <numeric name='Footfall' momentary='true' automaticReadout='true' value='45' unit='BPM'/>
    </timestamp>
   </node>
  </fields>
</message>
```

Sensor Data ⌒ 604

```
<message from='device@example.org'
  to='client@example.org/amr'>
  <fields xmlns='urn:xmpp:iot:sensordata' seqnr='1' done='true'>
   <node nodeId='Device01'>
    <timestamp value='2019-03-07T16:24:30'>
      <numeric name='Sound' momentary='true' automaticReadout='true' value='87' unit='Decibels'/>
    </timestamp>
   </node>
  </fields>
</message>
```

Demographic Packet Data ⌒ 606

```
<message from='device@example.org'
  to='client@example.org/amr'>
  <fields xmlns='urn:xmpp:iot:sensordata' seqnr='1' done='true'>
   <node nodeId='Device01'>
    <timestamp value='2019-03-07T16:24:30'>
      <numeric name='Gender' momentary='true' automaticReadout='true' value='F' unit='Gender'/>
    </timestamp>
   </node>
  </fields>
</message>
```

*FIG. 6*

TECHNIQUES FOR PRIVATE AND SECURE COLLECTION AND PROCESSING OF DATA FOR GENERALIZED ANALYSIS

RELATED APPLICATIONS

This application is a national phase application of International Patent Application No. PCT/IB2019/060182, filed Nov. 26, 2019, the disclosure of which is hereby incorporated herein by reference in its entirety.

TECHNICAL FIELD

This application relates to collection and processing of data over a network, and in particular to providing generalized analysis for preserving privacy of data sources.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise.

The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The number of network-connected intelligent devices continues to grow along with fast and accessible network infrastructure and data processing power. As part of this expansion of technology, it is becoming easier for more devices to be interconnected, with each other or with centralized or distributed data processing environments (e.g., in the cloud, on a network operator's premises). As one example, the fifth generation of cellular network technology (also referred to as "5G") has emerged and has shown the capability of enabling a large number of devices to be network-connected, possibly with high data throughput and/or low latency. This can and will be leveraged by developers of technology to collect or distribute data to and from network connected devices in a "just in time" (e.g., low latency) manner in order to support use cases that require or benefit from, for example, on-the-fly or real-time time collection and processing of data, in order to, for example, provide value added uses of data (e.g., insights, predictions, inferences).

Empowering connectivity of devices embedded within everyday objects is a key use case of 5G. It is expected that 5G will cause a proliferation in the nature, quality, and type of IoT devices and sensors connected over the mobile network. Data from these devices is essential for smart cities, smart factories, and other use cases. These data will be used to make predictions, generate inferences and insights, and improve performance and quality. Once fully realized, this will improve the quality of decisions made in factories, cities, and other geospatially defined areas, which are presently made without access to real-time data.

The value of IoT data over 5G is predicated on the ability for decision makers to request predictions and inferences calculated in real time using sensor data. In order to improve on current practice that relies upon historical and/or time-delayed data, it is essential that smart city and smart factory data are gathered as close to instantaneously as possible. Once gathered, these data must be processed quickly, and the result returned to the end user. A significant delay at any stage in the process reduces this solution's eventual value.

A system whereby end users can request individual-level data in real time poses serious concerns about privacy and consent. Ignoring privacy and reidentification, current privacy solutions are focused on obtaining consumers' consent. Commercial operators are required to obtain explicit consent before obtaining individual-level data with personally identifiable markers. While governments and law enforcement may obtain individual-level data without consent—such as automatic vehicle plate recognition systems or facial recognition infrastructure—usage of these data faces legal constraints. Without individual-level consent, planners rely on sensors such as those to measure footfall, temperature, or pollution. There is currently no mechanism to preserve privacy when incorporating data from end user devices into smart city, smart factory, or other infrastructure.

Preserving consumer privacy will be an important feature for gaining access to data from the consumers' IoT devices, mobile phones/smartphones, and other data-generating devices (collectively referred to as data source devices), which are set to become increasingly important sources of data. Due to changes in the network connection protocol, it is precisely this type of device that will proliferate under 5G. 5G mobile network connections require significantly less power than earlier generations of mobile networks. Consequently, an increasing number of items purchased by end users and consumers will incorporate sensors. Yet, the impact of this proliferation is limited unless end users and consumers can be assured their data will be kept private.

Privacy concerns at the intersection between privacy, mobile networks, and sensor data are non-trivial. Without safeguards, permitting end users to remotely access individuals' data on demand poses direct questions about privacy and surveillance. As a consequence, many lawmakers are already lining up against the expanded use of IoT data for smart cities, smart factories, and other use cases. Even if they are eventually stood up, lacking a clear commitment to privacy will either slow the adoption of 5G and the use of IoT data for planning purposes or severely limit potential use cases.

Put succinctly: the problem with current IoT and industrial IoT (IIoT) data management solutions is that they lack an architecture that preserves user privacy when using individual-level user data in real time. Current architecture and solutions do not allow end users to request information based on individual-level (e.g., user) data without exposing that data to end users (e.g., a technology company requesting the user data), where such data is potentially identifying of individual users (thus compromising users' privacy).

Other publications related to the topic of the private analysis of data inadequately address these issues, and/or are not efficient and scalable. For example, some techniques propose use of differential privacy to preserve inferences while scrambling the underlying data and/or generating synthetic mappings of the underlying distributions. Similar approaches apply differential privacy to database storage architectures in the cloud. Other approaches use cryptography to establish differential privacy. For IoT data in particular, some have proposed using mobile networks to analyze the resulting data—however, such techniques center around encrypting data transmissions or locally stored data.

There currently exist certain challenges. Currently, there are no existing solutions that permit request and processing of data from user devices in a privacy-preserving manner that is fast, responsive, and scalable.

SUMMARY

There is a desire for techniques that permit obtaining and processing of data from user devices in a privacy-preserving manner. The present disclosure proposes techniques that address these issues, including an architecture that allows data to be processed at the edge or in the cloud and then deleted after. Other aspects of the proposed techniques include allowing end users to geospatially define an area or volume, use the mobile network to request data from devices located within that area, process those data at the edge/in the cloud and return a prediction/inference, and finally delete the data without allowing end users to access them.

Certain aspects of the present disclosure and their embodiments may provide solutions to these or other challenges, including:
  The ability to define geospatial area or volume units for IoT data in either two- or three-dimensional space.
  The ability for a mobile network to ping data source devices located within an area unit and request data from responsive devices.
  A system to generate an anonymous identifier for each device (LocalID) and ping (PingID) once responsive devices receive a ping from the mobile network.
  An architecture that permits the processing of packets of data shared by data source devices at a processing environment (e.g., at the edge or in the cloud) that only returns group-level (e.g., specific to the respective geospatial area unit) analytical data (e.g., predictions and/or inferences).
  The capacity to delete the original data used to make group-level analytical data from the processing environment and send data source devices a receipt confirming the deletion of those data.

There are, proposed herein, various embodiments which address one or more of the issues disclosed herein.

In some embodiments, a computer-implemented method for obtaining data from one or more data source devices, based on a request, for protecting data source device privacy, comprises: receiving a request for analytical data made by a requester, wherein the request includes: information for identifying one or more data source devices to be queried for input data, a type of data processing to be performed on the input data for generating the analytical data, and a data type for the analytical data; in response to receiving the request, causing the one or more data source devices to be queried for the input data; and causing a response that includes the analytical data to be sent to the requester.

In some embodiments, a system for obtaining data from one or more data source devices, based on a request, for protecting data source device privacy, the system comprises one or more processor and memory, said memory containing instructions executable by said one or more processor whereby said system is operative to: receive a request for analytical data made by a requester, wherein the request includes: information for identifying one or more data source devices to be queried for input data, a type of data processing to be performed on the input data for generating the analytical data, and a data type for the analytical data; in response to receiving the request, cause the one or more data source devices to be queried for the input data; and cause a response that includes the analytical data to be sent to the requester.

In some embodiments, a non-transitory computer readable medium comprises instructions executable by one or more processor of a device, said instructions including instructions for: receiving a request for analytical data made by a requester, wherein the request includes: information for identifying one or more data source devices to be queried for input data, a type of data processing to be performed on the input data for generating the analytical data, and a data type for the analytical data; in response to receiving the request, causing the one or more data source devices to be queried for the input data; and causing a response that includes the analytical data to be sent to the requester.

In some embodiments, a transitory computer readable medium comprises instructions executable by one or more processor of a device, said instructions including instructions for: receiving a request for analytical data made by a requester, wherein the request includes: information for identifying one or more data source devices to be queried for input data, a type of data processing to be performed on the input data for generating the analytical data, and a data type for the analytical data; in response to receiving the request, causing the one or more data source devices to be queried for the input data; and causing a response that includes the analytical data to be sent to the requester.

In some embodiments, a computer program comprises instructions executable by one or more processor of a device, said instructions including instructions for: receiving a request for analytical data made by a requester, wherein the request includes: information for identifying one or more data source devices to be queried for input data, a type of data processing to be performed on the input data for generating the analytical data, and a data type for the analytical data; in response to receiving the request, causing the one or more data source devices to be queried for the input data; and causing a response that includes the analytical data to be sent to the requester.

In some embodiments, a computer-implemented method for obtaining analytical data based on input data from one or more data source devices for protecting data source device privacy, comprises: sending a request for analytical data, wherein the request includes: information for identifying one or more data source devices to be queried for input data, wherein the information does not uniquely identify the one or more data source devices, a type of data processing to be performed on the input data for generating the analytical data, and a data type for the analytical data; and receiving a response to the request that includes the analytical data, wherein the response does not include data that uniquely identifies the one or more data source devices.

In some embodiments, a system for obtaining analytical data based on input data from one or more data source devices for protecting data source device privacy, the system comprises one or more processor and memory, said memory containing instructions executable by said one or more processor whereby said system is operative to: send a request for analytical data, wherein the request includes: information for identifying one or more data source devices to be queried for input data, wherein the information does not uniquely identify the one or more data source devices, a type of data processing to be performed on the input data for generating the analytical data, and a data type for the analytical data; and receive a response to the request that includes the analytical data, wherein the response does not include data that uniquely identifies the one or more data source devices.

In some embodiments, a non-transitory computer readable medium comprises instructions executable by one or more processor of a device, said instructions including instructions for: sending a request for analytical data, wherein the request includes: information for identifying one or more data source devices to be queried for input data, wherein the information does not uniquely identify the one or more data source devices, a type of data processing to be performed on the input data for generating the analytical data, and a data type for the analytical data; and receiving a response to the request that includes the analytical data, wherein the response does not include data that uniquely identifies the one or more data source devices.

In some embodiments, a transitory computer readable medium comprises instructions executable by one or more processor of a device, said instructions including instructions for: sending a request for analytical data, wherein the request includes: information for identifying one or more data source devices to be queried for input data, wherein the information does not uniquely identify the one or more data source devices, a type of data processing to be performed on the input data for generating the analytical data, and a data type for the analytical data; and receiving a response to the request that includes the analytical data, wherein the response does not include data that uniquely identifies the one or more data source devices.

In some embodiments, a computer program comprises instructions executable by one or more processor of a device, said instructions including instructions for: sending a request for analytical data, wherein the request includes: information for identifying one or more data source devices to be queried for input data, wherein the information does not uniquely identify the one or more data source devices, a type of data processing to be performed on the input data for generating the analytical data, and a data type for the analytical data; and receiving a response to the request that includes the analytical data, wherein the response does not include data that uniquely identifies the one or more data source devices.

In some embodiments, a computer-implemented method performed by a data source device for responding to a query for data, comprises: receiving a query for requested data, wherein the query includes: a request identifier, and an indication of the requested data to be shared, wherein the query is based on a request originating from a requester; and in accordance a determination that the data source device has the requested data and is permitted to share the requested data, transmitting, to one or more nodes, a data unit for processing in a trusted processing environment, wherein the one or more nodes and the trusted processing environment do not include the requester, and wherein the data unit includes: a unique identifier for the data source device, and the requested data; and subsequent to transmitting the data unit, receiving an indication that the data unit was deleted by the trusted processing environment.

In some embodiments, a system for responding to a query for data, the system comprises one or more processor and memory, said memory containing instructions executable by said one or more processor whereby said system is operative to: receive a query for requested data, wherein the query includes: a request identifier, and an indication of the requested data to be shared, wherein the query is based on a request originating from a requester; and in accordance a determination that the data source device has the requested data and is permitted to share the requested data, transmit, to one or more nodes, a data unit for processing in a trusted processing environment, wherein the one or more nodes and the trusted processing environment do not include the requester, and wherein the data unit includes: a unique identifier for the data source device, and the requested data; and subsequent to transmitting the data unit, receive an indication that the data unit was deleted by the trusted processing environment.

In some embodiments, a non-transitory computer readable medium comprises instructions executable by one or more processor of a device, said instructions including instructions for: receiving a query for requested data, wherein the query includes: a request identifier, and an indication of the requested data to be shared, wherein the query is based on a request originating from a requester; and in accordance a determination that the data source device has the requested data and is permitted to share the requested data, transmitting, to one or more nodes, a data unit for processing in a trusted processing environment, wherein the one or more nodes and the trusted processing environment do not include the requester, and wherein the data unit includes: a unique identifier for the data source device, and the requested data; and subsequent to transmitting the data unit, receiving an indication that the data unit was deleted by the trusted processing environment.

In some embodiments, a transitory computer readable medium comprises instructions executable by one or more processor of a device, said instructions including instructions for: receiving a query for requested data, wherein the query includes: a request identifier, and an indication of the requested data to be shared, wherein the query is based on a request originating from a requester; and in accordance a determination that the data source device has the requested data and is permitted to share the requested data, transmitting, to one or more nodes, a data unit for processing in a trusted processing environment, wherein the one or more nodes and the trusted processing environment do not include the requester, and wherein the data unit includes: a unique identifier for the data source device, and the requested data; and subsequent to transmitting the data unit, receiving an indication that the data unit was deleted by the trusted processing environment.

In some embodiments, a computer program comprises instructions executable by one or more processor of a device, said instructions including instructions for: receiving a query for requested data, wherein the query includes: a request identifier, and an indication of the requested data to be shared, wherein the query is based on a request originating from a requester; and in accordance a determination that the data source device has the requested data and is permitted to share the requested data, transmitting, to one or more nodes, a data unit for processing in a trusted processing environment, wherein the one or more nodes and the trusted processing environment do not include the requester, and wherein the data unit includes: a unique identifier for the data source device, and the requested data; and subsequent to transmitting the data unit, receiving an indication that the data unit was deleted by the trusted processing environment.

Certain embodiments may provide one or more of the following technical advantage(s). The value of IoT data to unlock new possibilities for smart cities, smart factories, and/or other use cases is predicated on three factors. First, the technological advantages of 5G will result in the widespread adoption of passive sensors. Freed from needing to be constantly charged, data from these passive sensors will support richer inferences and/or predictions about the physical world. Second, end users (e.g. urban planners, factory foremen, retail managers) must have a standard process to request and analyze data from these sensors. Sensor data is low value without a means of defining area units, requesting data from devices located there, and sharing these data over the mobile network. Finally, consumers must trust that the data they share will be kept private and not used to identify them or their behavior and this claim must be ensured technologically.

The aspects of the architecture described herein can help protect consumers' privacy while allowing end users to build statistical models that incorporate their data. For example, 5G can make this possible, in which case the process of querying these devices is centralized in the mobile network. However, it is still possible that other gateways like WiFi, Bluetooth and 4G/LTE are used. The techniques discussed herein can be agnostic as to the type of connection. Given its speed and latency, 5G can also empower the analysis of the resulting data at the edge and/or in the cloud, however one of skill in the art would recognize that the techniques herein are not necessarily limited to being used on, or enabled by, 5G or other specific networking technology, standard, or protocol. As these data are not stored locally (e.g., by the end user requesting the user data processing), it also facilitates their deletion, which preserves consumer privacy. Finally, as it is based on mobile networks, the techniques can allow end users to send multiple, simultaneous queries.

It is also impossible to understand the advantages of being able to use consumer IoT data while preserving users' privacy. Without a clear and consistent message and process about how consumers' data is kept private and protected from identification, consumers will avoid buying devices with passive sensors embedded and refuse consent for their data to be used. In the worst-case scenario, this will prevent the realization of 5G's benefits to society.

The techniques described herein can provides new ways to make private group-level predictions from individual-level data due to, for example:
  Processing user data at the edge or in the cloud
  Combining data from IoT devices such as sensors or consumer devices with other data sources at the edge or in the cloud
  Using machine learning and AI to automate and continuously improve the prediction- and/or inference-generation process
  Edge and/or cloud computing to greatly speed up the generation of group-level predictions and/or inferences
  Discarding all user data used to generate group level perditions and/or inferences
  Sending a receipt confirming deletion to the device
  Generating single-use area data identifiers The disclosed aspects of the proposed architecture can provide the following advantages:
  Speed: using fast gateways to access centralized mobile network data, such as 5G, edge computing, and cloud computing will allow the generation of predictions and/or inferences more quickly than current solutions Scalability: The architecture is scalable since it can be cloud- and edge-based.
    Flexibility: The architecture is flexible since the generation of analyitical data (e.g., predictions and/or inferences) can be done at the edge or in the cloud.
    Privacy: by deleting underlying data, it can far more private that existing solutions.
    Context: By aggregating end user data into data arrays (e.g., AreaIDs), it can use contextual information to improve group-level predictions and/or inferences.

BRIEF DESCRIPTION OF THE DRAWINGS

FIG. 6 illustrates exemplary data source device response data in accordance with some embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
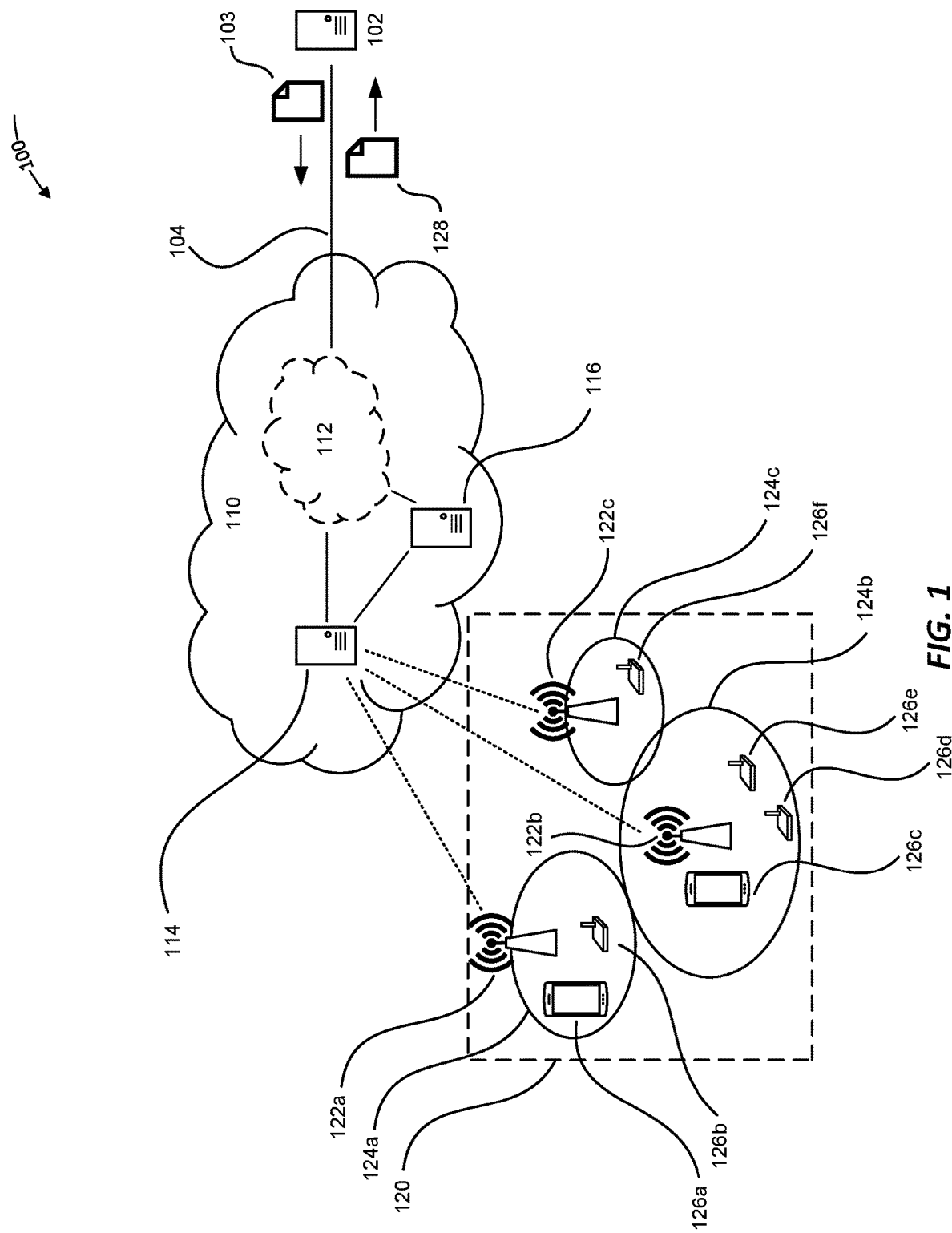
FIG. 1 illustrates an exemplary system in accordance with some embodiments.

FIG. 1 illustrates an exemplary system 100 in accordance with some embodiments. System 100 illustrates an exemplary system that is comprised of exemplary, systems, devices, and connections that will be used to illustrate the embodiments described herein. As one of skill would appreciate, system 100 is merely provided as an illustration of one such possible configuration of such a system, however other such configurations (e.g., additional devices, fewer devices, additional interconnections, fewer interconnections, different interconnections) are possible that would not depart from the nature and function of the techniques described herein, and all such configurations are intended to be within the scope of this disclosure.

System 100 in FIG. 1 illustrates an exemplary requester 102 which is connected (via connection 104) to an exemplary network 110, a mobile network (e.g., a cellular network). Requester 102 can be one or more of a device, machine, server, or the like, of an end user. An end user is, for example, an operator that requests collection and/or processing of data from one or more data source devices (e.g., user devices, IoT devices, IIoT devices). Connection 104 is for example, any of a wired connection, a wireless connection, or some combination thereof.

Network 110 is, for example, comprised of one or more systems (e.g., devices) that form one or more paths for the flow of data from the requester 102 to one or more data source devices (e.g., 126a-126f). In this example, a request 103 (e.g., a computer readable command, message, or the like) sent by requester 102 through network 110 can pass through any number of nodes (e.g., represented by node cloud 112, which represents an optional number of additional nodes, including zero), including node 114. A node is, for example, one or more system, device, computer, server, switch, or the like, that is capable of receiving, transmitting, forwarding, and/or processing data. For example, network 110 can be one or more telecommunications network that is operated by one or more telecommunications network operator (e.g., a cellular network operator, a broadband network operator). In this example, node 114 receives the request 103 from the requester via node cloud 112. The request 103 is a request for analytical data, processed from data provided by data source devices within a geographical area unit 120.

In some embodiments, a network (e.g., 100) includes one or more trusted processing environments (e.g., made up of one or more nodes, devices, systems). In this example, network 110 includes a trusted processing environment 116. In some embodiments, a trusted processing environment is operated by an operator of the network (e.g., cellular network). A trusted processing environment can be used, for example, to process data collected from data source devices (e.g., to derive inferences from such data) based on a request from a requester, without having to expose or provide the collected data to the requester. For example, a cellular network operator can operate the trusted processing environment 116, and it can be part of the network 110 maintained by such operator. In some embodiments, a trusted processing environment is not operated by an operator of the network (e.g., cellular network). For example, the trusted processing environment 116 can be operated by a third-party whose identity is different from any of: the one or more data source device users, the one or more network operators, and the requester end user.

FIG. 1 includes exemplary geospatial area unit 120. In this example, geospatial area unit 120 includes within its boundaries (e.g., the dotted lines) several exemplary data source devices 126a-126f. In this example, the request 103 from requester 102 designates geospatial area unit 120, such that the request (to node 114) is for an inference and/or prediction based on data from data source devices within geospatial area unit 120. In this example, the data source devices 126a-126f are connected to network 110 via at least one of access nodes 122a-122c (e.g., access points, base stations). In this example, data source device 126a (e.g., a user's smartphone) and data source device 126b (e.g., an IoT device) are connected to access node 122a, data source device 126c (e.g., a user's smartphone) and data source devices 126d and 126e (e.g., IoT devices) are connected to access node 122b, and data source device 126f (e.g., an IoT device) is connected to access node 122c. In some embodiments, access nodes (e.g., 122a-122c) are associated with a geospatial area unit based on being physically located within the geospatial area unit (e.g., a wireless access point or base station's physical radio is located inside of the geospatial area unit). In some embodiments, access nodes are associated with a geospatial area unit based on providing connectivity to devices that are or may be physically located within the geospatial area unit (e.g., a wireless access point or base station's physical radio is not located inside of the geospatial area unit, but provides wireless connection to devices that are (or can be) inside of the geospatial are unit). For example, if the wireless connectivity service area of 124a, 124b, or 124c were partially outside of geospatial area unit 120, then their respective access points 122a-122c could still be considered associated with the geospatial area unit 120 because they would provide connectivity to devices that can be inside of geospatial area unit 120. In this example, each access node 122a-122c, and their respective wireless connectivity service areas 124a-124c, are located inside of area 120.

As will be described in more detail below, one or more components of a system such as system 100 can be used to request analysis of data from devices within a geospatial area unit, request and process information from appropriate data source devices, and respond to such request, in a manner that preserves data source device privacy from the requester. For example, a data source device 126c receives the request 103 made by requester 102 via network node 114 and access node 122b. In response, data source device 126c provides responsive information (e.g., a sensor reading) back to network node 114 via access node 122b. In this example, network node 114 causes trusted processing environment 116 to process the information provided by data source device 126c (e.g., as well as information from one or more other responding devices 126a-126f in response to the request), to arrive at output data (e.g., analytical data that includes an inference and/or prediction) based on the data source device data. The output (e.g., inference and/or prediction) is provided back to the requester 102 (e.g., directly, or via another node such as node 114). In this example, after the requester is provided the response, the data source device data is deleted from the trusted processing environment 116 (e.g., and from other nodes in the network, such as node 114), and a confirmation is sent to the responding data source devices that their information has been deleted.

Forwarding the request to the data source device(s) is also referred to herein as sending a "ping", "pinging", sending a "query, "querying", or the like. While this disclosure may references forwarding a request to one or more nodes or data source devices, one of skill would understand that such forwarding can include repacking or reformatting the request, including additional data, or removing some data, all of which are intended to be within the scope of the phrase unless otherwise noted, without functionally changing the operation of the request (e.g., in identification of particular data that is being requested).

Geospatial Area Unit Setup

Prior to end users being able to ping the mobile network for data, the end users must (1) demonstrate rights (e.g., ownership) over a geospatial area, and (2) define area units within the geospatial area or volume they claim. For readability and backwards compatibility, the terms geospatial area and geospatial area unit are used to describe either a two-dimensional space (e.g., traditionally referred to as an area) or three-dimensional space (e.g., a volume).

As used herein, a geospatial area is a space (e.g., area or volume) over which an end user establishes rights, while a geospatial area unit is a particular unit of space (e.g., area or volume) defined for requesting data. For example, a geospatial area unit can be considered as a specific subdivision of the geospatial area. The geospatial area can be considered to be the maximum allowable extent of a geospatial area unit. For example, an owner of a 10,000 square meter piece of land (the geospatial area) can, as just one example, define two geospatial area units of 5,000 square meets (e.g., split it into two halves) for querying individually and separately. Considering geospatial area as a distinct concept from geospatial area unit can be useful where an end user creates multiple geospatial area units from a single geospatial area, however one of skill would understand that in some implementations a geospatial area could be considered equivalent to a geospatial area unit (e.g., an one used instead of the other). In some embodiments, geospatial area(s) and geospatial area unit(s) are stored in a database (e.g., of network 110, or the operator of the request and processing service), along with rights information for one or more end users with respect to those areas and area units.

Geospatial Area Rights

The system outlined in this invention allows end users to query consumers' devices and receive group-level analysis (e.g., predictions, inferences). In some embodiments, prior to being granted permission to query the network, end users must enroll (e.g., with network 110) and establish rights (e.g., claim ownership) over a geospatial area. For example, without restricting access, malicious actors could overwhelm the mobile network by sending frivolous pings. This could, for example, drain passive sensors' batteries and potentially cause the mobile network to fail.

A process for establishing rights to a geospatial area can be managed by the network operators (e.g., that operate the one or more networks that connect data source devices) or by networking and telecommunications entities that enable the service (e.g., third-party service providers to the network operators). After an end user (e.g., an organization, an individual associated with an organization) establishes their rights over a given geospatial area (e.g., by showing employment with a government or ownership of a particular facility within that area), the end user, for example, is assigned a user identifier (e.g., also referred to herein as a UserID). This rights verification process can be done manually (e.g., partially, with user intervention), or automatically when ownership is clearly understood (e.g., verified using trusted information). For example, a UserID is then associated with a set of network access points (e.g., 122a-122c) with coverage in the geospatial area over which the end user claims has rights.

As an example, end users can then use their UserID to define geospatial area units manually (e.g., for each individual request), or automatically using predetermined geospatial area units based on given radii, shapes, or any other predetermined configuration.

In some embodiments, a representation (e.g., a data array) of a geospatial area unit is created and stored (e.g., by a network node, such as a server). In some embodiments, each geospatial area unit is an array that contains identification of the one or more access points (e.g., base station radios) at locations associated with the geospatial area unit (e.g., located inside the geospatial perimeter; provides wireless coverage that includes locations inside the geospatial perimeter). In some embodiments, after being defined, a UserID is associated with an array of one or more geospatial area units.

Notably, the process or processes usable to generate UserIDs, store or otherwise associate access points with the UserIDs, for drawing/defining boundaries of geospatial area units/areas/particular locations, and for identifying rights for end users to geospatial area units/area boundaries/particular locations can be implemented in various ways, the details of which are not required for understanding the techniques described herein, and thus are not discussed in more detail here.

Defining Geospatial Area Units

After enrollment and associating one or more access points with a UserID, end users must create geospatial area units. A geospatial area unit refers to a two-dimensional space at a particular geospatial location (e.g., comprising boundaries delimited by latitude and longitude), or a three-dimensional space at a particular geospatial location (e.g., comprising boundaries delimited by latitude, longitude, an altitude value, and a height). In some embodiments, a geospatial area unit is defined using one or more of the following values: location (e.g., latitude, longitude, and altitude), dimension (e.g., width, depth, and height), and orientation (e.g., angle of rotation with respect to world origin). A two-dimensional geospatial area unit can have a height with a value of zero, for example.

The size and shape of a geospatial area unit can be arbitrary within the maximum extent of the geospatial area over which rights have been established (e.g., as described above). For example, for urban planners employed by a city government, a geospatial area unit can be defined as the area within city boundaries (e.g., the maximum entitled area), or as one square city block (e.g., where each city block is a geospatial area unit). In some embodiments, a geospatial area unit is required to have one or more minimum values (e.g., length) in one or more dimensions (e.g., x-axis, y-axis, z-axis). For example, a device in charge of creating geospatial area units can require that an end user specify a minimum length (e.g., 150 meters) in every dimension (e.g., depth, width, height). This can, for example, guard against data sparsity allowing identification of end users (e.g., defining geospatial area unit to be a single residential household). In some embodiments, a node that receives a request to create or ping devices from a geospatial area unit that violates such minimum size requirements can be rejected (e.g., an error returned to the requester; the request is ignored or discarded).

Figure 2:
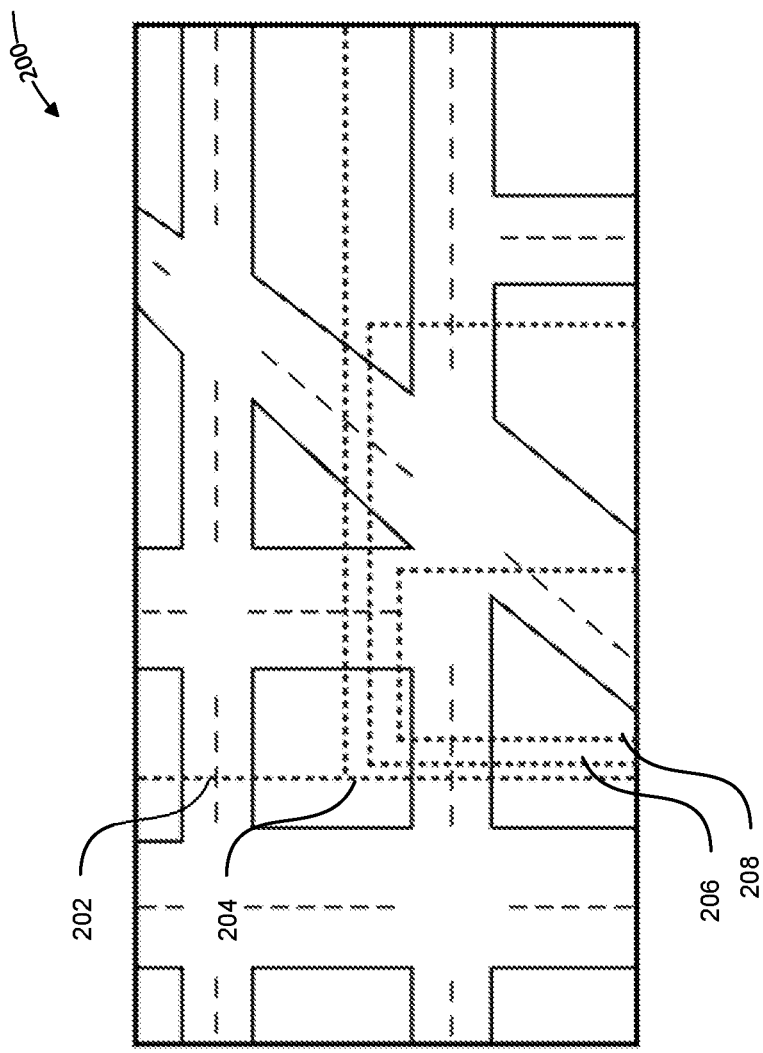
FIG. 2 illustrates exemplary geospatial area units in accordance with some embodiments.

FIG. 2 illustrates several exemplary geospatial area units. In FIG. 2, four geospatial area units (e.g., 202, 204, 206, 208) are shown in a hypothetical urban environment 200. Each dashed rectangle represents a geospatial area unit (e.g., that can include one or more sensors, IoT devices, probes, or user devices) within an arbitrary and static geo-fence (e.g., solid border). Geospatial area unit 202 is adjacent and non-overlapping with geospatial area unit 204. Geospatial area unit 206 is fully enclosed within geospatial area unit 204, and geospatial area unit 208 is fully enclosed within geospatial area unit 206. A geospatial area unit can be overlapping with, adjacent to, completely within or surrounding another geospatial area unit. While FIG. 2 shows an overhead view of the urban environment, geospatial area units 202, 204, 206, 208 can be defined as two-dimensional areas delimited as shown, and/or have a third dimensional component for its location (e.g., altitude), and size (e.g., height). In some embodiments, if a geospatial area unit is specified in a request, a data source device located within the geospatial area unit provides data in a response to the request (e.g., includes such data in the AreaID data array generated by the data source device). Such provided data can be used (e.g., aggregated with other data) to process and generate the output in accordance with the request. On the other hand, for example, requested data from a data source device that is not within the specified geospatial area unit is excluded from processing (or from receiving the request at all), even if that data source device is geospatially closer to the end user device (the requester).

Figure 3:
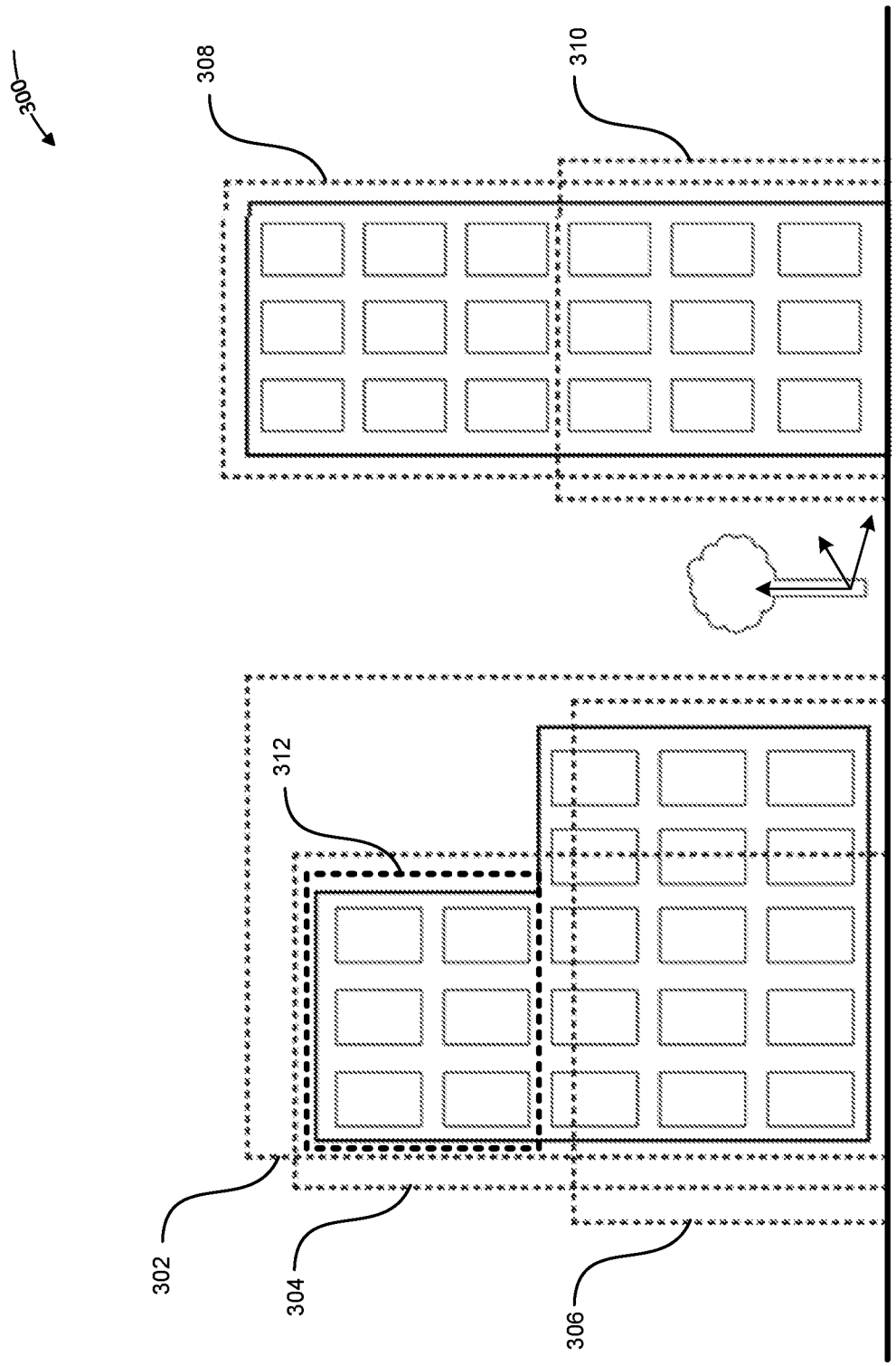
FIG. 3 illustrates exemplary geospatial area units in accordance with some embodiments.

FIG. 3 illustrates several exemplary three-dimensional geospatial area units. As shown, an urban environment 300 includes two buildings that are divided into five geospatial area units. In FIG. 3, the buildings are shown from a side view (e.g., elevation view), to show heights of geospatial area units (that also have two-dimensional footprints, and thus three total dimensions). The building on the left is divided into four geospatial area units 302, 304, and 306 and 312. All four share the same latitude and longitude but 312 has different altitude. Geospatial area unit 302 includes the entirety of the left building (e.g., it includes the footprint of the building, as well as enough height to capture each floor of the building). Geospatial area unit 304 includes much of the left side of the left building, but excludes some portions of the right side of the left building. Geospatial area unit 306 includes the lower floors of the entire left building, but excludes some of the higher floors. While geospatial area unit 312 excludes the lower three floors of the building. The building on the right is divided into two geospatial area units 308 and 310, which share the same location (latitude, longitude and altitude). Geospatial area unit 308 includes the entirety of the right building (e.g., it includes the footprint of the building, as well as enough height to capture each floor of the building). Geospatial area unit 310 includes the lower three floors of the entire right building, but excludes the highest three floors. In FIG. 3, for example, geospatial area unit 308 and 310 have the same width and depth (e.g., footprint), but different heights thought the boundaries are shown slightly offset (e.g., for ease of viewing). As can be seen in FIGS. 2 and 3, geospatial area units can be defined in many desired configurations and shapes in order to allow the inputs for generating analytical data (e.g., in an inference) to be focused as desired, thus making such analytical data potentially more valuable.

For example, in FIG. 3, assume that: the altitude of 302, 304, 306 is 0 m (above ground level), the altitude of 312 is 9 m, the height of 302 and 304 is 15 m, the height of 306 is 6 m the height of 312 is 6 m. In that case, assuming that the tree is the map origin and the building is 2 m deep in total and that each window represents about 3 m by 2 m, and assuming that each geospatial area unit's position origin is defined in their lower-left corner, then the approximate definition of geospatial area unit 302 is location (−14, 0, 0) and size (10, 2, 15), and the approximate definition of geospatial area unit 312 is location (−14, 0, 9) and size (6, 2, 6).

As noted above, end users who establish their bona fide claims (e.g., rights) to administer a particular geospatial space (e.g., an area or volume at a particular geospatial location) can then define one or more geospatial area unit within that geospatial area (also referred to as a geospatial space). A geospatial area unit is a two- or three-dimensional space of arbitrary shape and dimensions. In some embodiments, there are constraints on the characteristics of a geospatial area unit. In some embodiments, a constraint is that the geospatial area unit must not be larger than the maximum geospatial extent to which an end user has rights (e.g., the geospatial space). For example, a city's planning department cannot define and claim area units that extend outside of the city's limits. Similarly, a factory foreman cannot define and claim area units that extend beyond her factory's property line. Data on municipal and/or infrastructure boundaries can be obtained from various sources, the details of which are not essential to the understanding of the techniques described herein, and are thus not described in more detail.

While geospatial area units are static, the data source devices located within it can change as users of those devices move through space. For example, when an end user selects which geospatial area unit(s) to include in the request, they are also selecting which access points (e.g., cellular tower(s)) will direct the ping to devices. When devices transition from one area unit to another, they will respond to the pings for which their devices qualified. In some embodiments, devices that are outside an area unit (e.g. are connected to access points outside the geospatial area unit) will not receive the ping. For example, if the AreaID of a data source device outside of the geospatial area unit is somehow received by a trusted processing environment, the AreaID will be deleted and a receipt sent. Responses that are from data source devices within overlapping geospatial area unit boundaries can be included (e.g., device 410b in FIG. 4).

Figure 5:
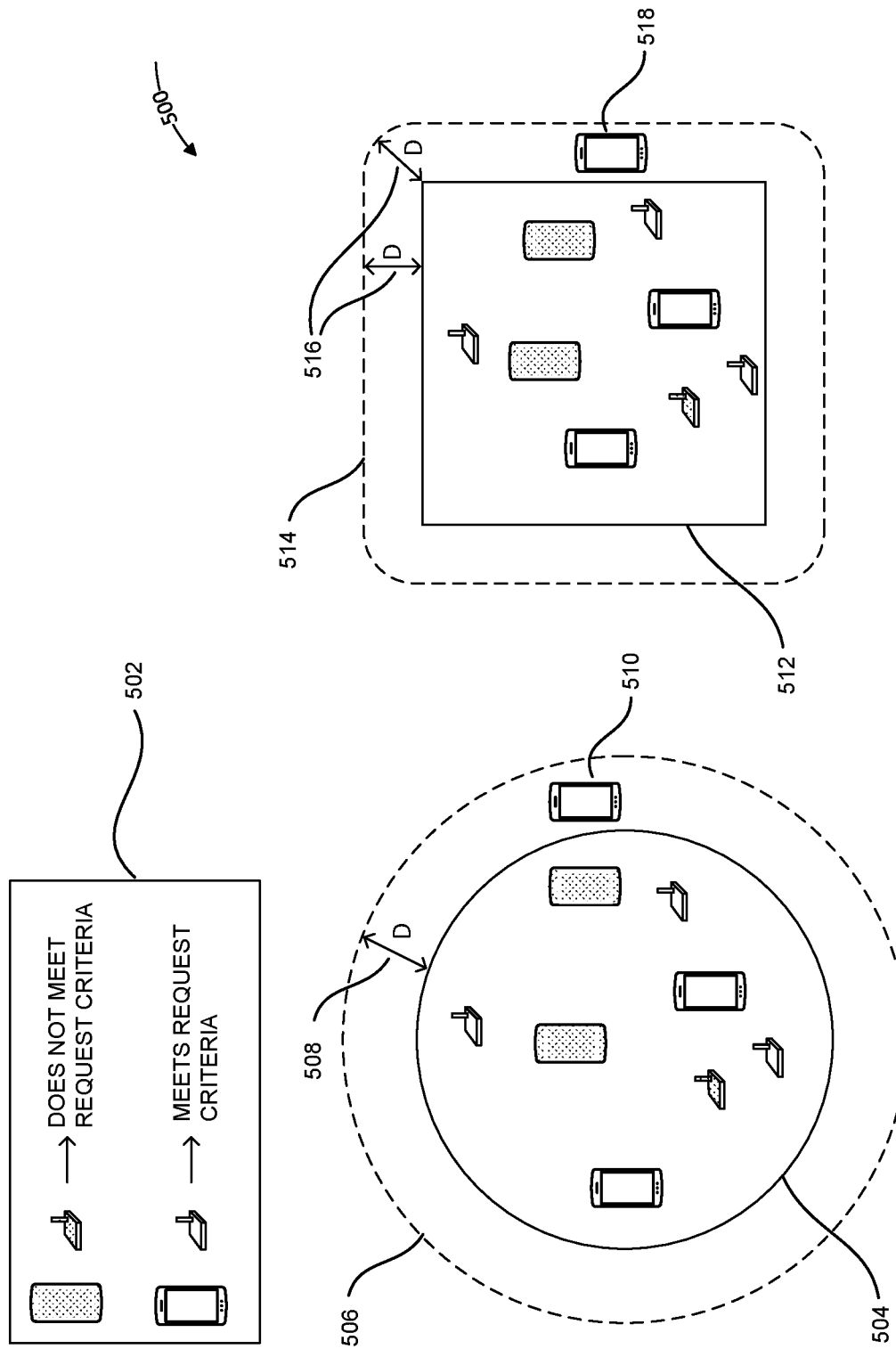

Notably, the set of data source devices in located in a geospatial area unit can change over time as data source devices travel through space and connect to different access points. Accordingly, some amount of additional physical buffer space (e.g., defined by D, described with respect to FIG. 5 below) can be used to capture movement very near the borders of a geospatial area unit. An example is the use of a distance D (e.g., 508 and 516), described with respect to FIG. 5 below. For example, after setting a maximum allowed distance D from the border of the geospatial area unit, data from devices located outside the maximum value of D will not be sent pings from the end user. If they are somehow received by the edge or cloud computing center, they will be discarded and deleted.

Network Query

Figure 4:
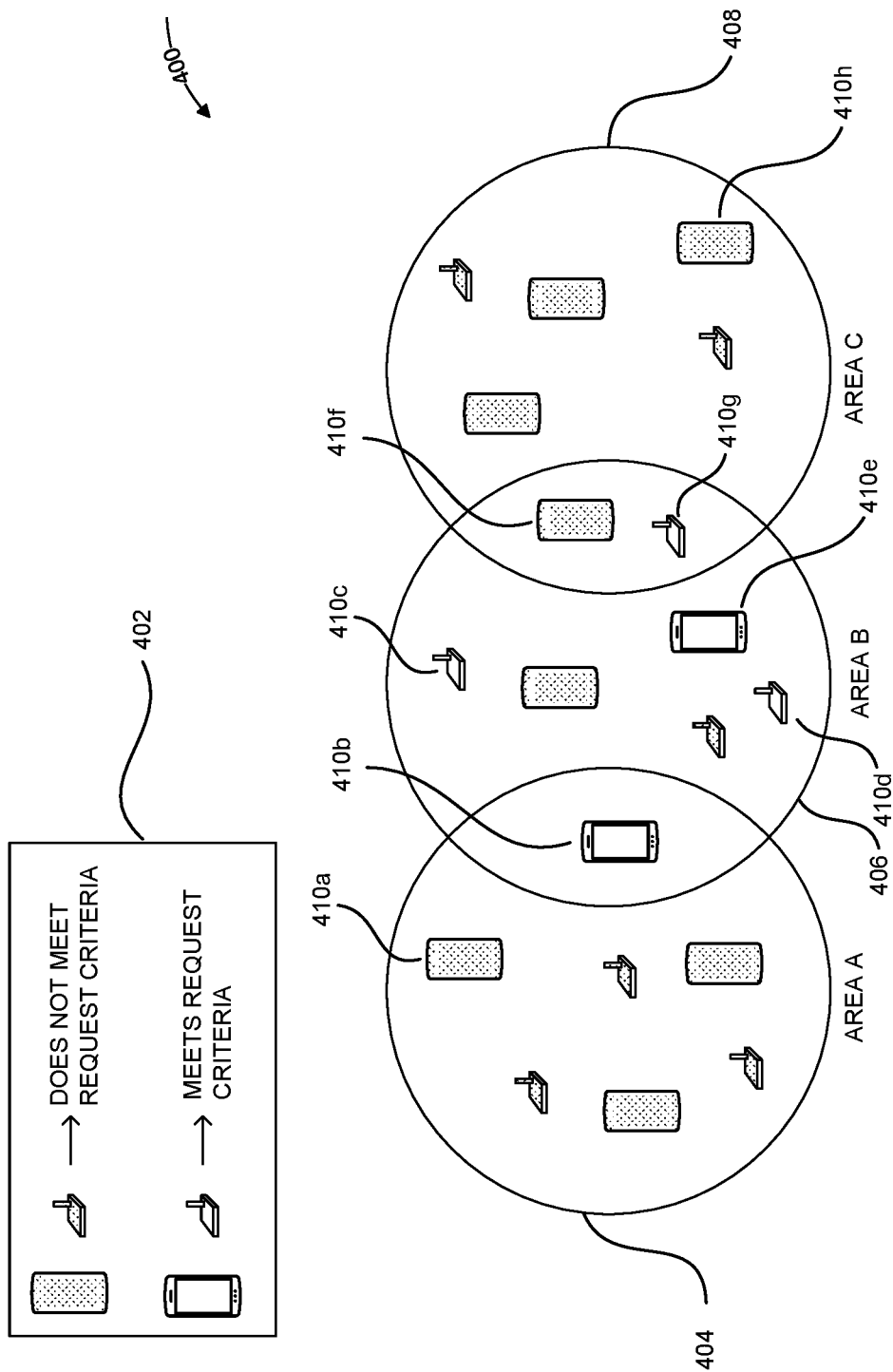
FIG. 4 illustrates exemplary geospatial area units and data source devices in accordance with some embodiments.
FIG. illustrates exemplary geospatial area units and data source devices in accordance with some embodiments.

FIG. 4 illustrates exemplary data source devices located in different geospatial area units, where some data source devices meet criteria in a request. As an example, a requester (e.g., 102) (e.g., an end user's management platform, device, system, software, or tool) can send a request (e.g., 103) (e.g., also referred to herein as a ping) for a prediction and/or inference using data from one or more geospatial area units associated with the end user's UserID. This request can be assigned a unique identifier (e.g., also referred to as a PingID). In some embodiments, the request specifies the required output (e.g., analytical data, prediction, inference, units) and statistical model (e.g., machine learning model, algorithm) used to generate that output. For example, this can be a requirement for requests handled by a network node (e.g., 114). An example statistical model is described below. In some embodiments, a request includes one or more indications of a geospatial area unit. In some embodiments, the request includes additional criteria (e.g., that define a subset of data source device types that are to be queried and/or whose data is to be used to create the required output, or that excludes a subset of data source devices that are not to be queried and/or whose information is not to be used to create the required output). For example, when predicting traffic delays, end users may opt to include or to exclude data from footfall sensors, while including data from road vehicle detection sensors. In some embodiments, requests (e.g., from the end user device) can be scheduled, automatic, or manual.

As used herein, a "data source device" can mean that the device generates the data itself (e.g., a device having an onboard or integrated sensor) or that collects data from one or more locally connected devices or sensors (e.g., a smartphone that collects data from a locally paired (connected) smartwatch).

In the example of FIG. 4, a requester (e.g., 102) sends a request (e.g., 103) (e.g., via node 114) for a temperature reading from data sources devices located within AREA B (an exemplary geospatial area unit), noted by boundary 406.

In some embodiments, the request is assigned a unique identifier. In some embodiments, a query (e.g., PingID) is generated that includes the unique identifier and the requested data. For example, the PingID is a data array that includes the unique identifier, requested data, and optionally a timeout value. In some embodiments, the request and/or the query describes the requested data field (e.g., temperature, location, or velocity). For example, the request and/or the query can include a variable whose definition is predefined (e.g., temperature in degrees centigrade) or specify how the variable is to be constructed. In some embodiments, the query does not include information regarding the type of data processing to perform (e.g., statistical model). For example, the PingID sent to data source devices does not include information regarding the type of statistical model to be used, the data type to be returned, or the like, which can simplify the query/PingID.

In some embodiments, the request and/or query can include (e.g., be required to include) a request timeout value (e.g., a maximum wait time, measured in milliseconds) for data source device responses. The request timeout value, for example, defines the longest period of time end users are willing to wait between making a request and receiving data. This value (also referred to as "Max.Time") can be included in every PingID.

Notably, the one or more processes for designing and implementing a statistical model and applying it to data can be achieved in many ways, the specifics of which are not needed for understanding the techniques described herein, and thus are not described in more detail here. However, one possible example statistical model that could be applied to data (from one or more data source devices) is described below for the benefit of the reader. Similarly, details of an interface (e.g., rendering of a graphical user interface (GUI)) through which an end user (e.g., operating the requester device) can select variables/parameters/criteria/geospatial area units for a request can be achieved in many ways, the specifics of which are not needed for understanding the techniques described herein, and thus are not described in more detail here.

Continuing with the example in FIG. 4, after the request and/or PingID are generated, one or more nodes (e.g., 114) in a network routes the request and/or PingID to access points (e.g., cellular base stations) located within the requested geospatial area unit, AREA B in this example. The mobile network (e.g., one or more nodes of network 110) forwards the query/ping (e.g., PingID) to data source devices located within the area unit. In this example, each device within AREA B, including devices 410b, 410c, 401d, and 410f receive the PingID. FIG. 4 includes a key 402 that illustrates which devices meet request criteria (e.g., devices illustrated without shading) and which devices do not meet request criteria (e.g., devices illustrated with shading) As can be seen, all of the devices that are included within AREA A (defined by boundary 404) that are not also included in AREA B (e.g., device 410b) do not meet the request criteria (e.g., because they are not within the specified geospatial area unit of AREA B). Similarly, all of the devices that are included within AREA C (defined by boundary 408) that are not also included in AREA B (e.g., device 410g) do not meet the request criteria (e.g., because they are not within the specified geospatial area unit of AREA B). Notice that geospatial area units can overlap, and that devices can simultaneously be considered to be within multiple geospatial area units at a given time.

As can be seen in FIG. 4, not all devices within the specified geospatial area unit AREA B meet the request criteria. This can be due to, for example, a device not meeting specific specified criteria included in the request (e.g., devices must be of a specified class or type (e.g., smartphone)), and/or the user of the device not having opted-in to sharing the type of information requested (or any information). In FIG. 4, only devices 410b, 410c, 410d, 410e, and 410g meet the request criteria. In some embodiments, the query includes such criteria. For example, a device determines that it does not meet the criteria in the query (e.g., PingID) and ignores the query or returns a data array that is empty.

In some embodiments, the data source devices' physical location is obtained using location services. For example, location services can use either GPS, Bluetooth, Wi-Fi, or cellular (e.g. 5G) radio signals to estimate the location of the device. Notably, location accuracy might depend on the availability of different radio signals. 3GPP Release 16 promises to make high precision location services cheaper and more reliable via 5G. The combination of cellular-based and hybrid positioning location services can deliver both absolute and relative positioning.

In some embodiments, data source devices whose owners have opted out of data sharing will ignore this ping. For example, the user of device 410f has opted out of sharing temperature data, and thus device 410f can be considered to not meet the criteria of the request. In one example, the device 410f can ignore the ping and not transmit a response.

In some embodiments, a geospatial area unit includes additional area or volume that is within an additional threshold distance from the geospatial area unit boundaries. For example, referring to FIG. 5 now, an example area unit defined by boundary 504 can be considered to include additional area that is a distance D 508 from the actual boundaries of the literally defined geospatial area unit, which creates an effective geospatial area unit boundary of 506. Thus, a request for the geospatial area unit defined by 504 (a circle) would include data source device 510 if it meets the criteria of such request, which it does in this example. This can, for example, smooth any inaccuracies that result from device movement and/or location services being inexact. Such additional threshold distance can apply to geospatial area unit of any shape. Similarly, an example area unit defined by boundary 512 (a square) can be considered to include additional area that is a distance D 516 from the actual boundaries of the literally defined geospatial area unit, which creates an effective geospatial area unit boundary of 514. Thus, a request for the geospatial area unit defined by 512 would include data source device 518 if it meets the criteria of such request, which it does in this example. One of skill can appreciate that when the phrase geospatial area unit is used herein, this can include any such additional area (e.g., for the sake of simplicity when using the term), unless otherwise noted. The concept of additional volume (e.g., using a distance D) can similarly be applied to three-dimensional geospatial area units.

Establishing the additional physical buffer (e.g., D) can be achieved in several ways, and the specifics of the particular technique used to do so is not necessary for understanding the techniques herein, and thus are not described in more detail. However, one possible measure of distance is Minkowski distance, as a generalization of both Euclidian and Manhattan distance. The Minkowski distance between points X and Y is defined as:

$$D(X, Y) = \left(\sum_{i=1}^{n} |x_i - y_i|^p\right)^{1/p}$$

In some embodiments, the origin of the additional distance (e.g., D) allowed for calculation comes from one or more of the requester, a network node operator, and a data source device. For example, the distance D could be set as a general privacy setting by the end user, by the network operator, or be defined by custodians of facilities to separate different spaces.

Referring again to the example of FIG. 4, upon receiving the PingID, each data source device (e.g., 410b, 410c, 410d, 410g) whose owners have consented to data sharing automatically generate a uniquely identifiable data object. A uniquely identifiable data object (e.g., also referred to herein as an AreaID) is a data array that that is uniquely identified by an included identifier (e.g., a randomly generated alphanumeric string). In some embodiments, each AreaID includes the PingID that caused its generation. In response to receiving the PingID, a data source device determines whether it has data of the type requested by the PingID. For example, device 410b determines that it does have a temperature data collected from an onboard temperature sensor. If the data source device does have the requested data, the data source devices appends the requested data into the AreaID data array. If the data source device does not have the requested data, it does not append data into the AreaID data array. For example, the data source device can transmit the AreaID with no appended requested data, essentially returning (e.g., to the network node 114) an empty array (e.g., a unique identifier and no requested data). An example of exemplary AreaID data is included in FIG. 6 of a hypothetical footfall sensor located at 140 New Montgomery St, San Francisco, CA Another example is also included in FIG. 6 of data from a hypothetical temperature monitor without location data.

To improve trusted processing environment output (e.g., analytical data output such as predictions and/or inferences), data source device users/owners can consent (e.g., in an initial setup process) to enrich their AreaID data array with supplemental demographic information (e.g., data in addition to the specifically requested data). In some embodiments, if data source device users/owners consent to including this supplemental data, they control the contents of these additional data (e.g., via an application or setting on their device (e.g., smartphone) or when initializing the device (e.g., IoT device)). The supplemental data can include fields, for example, that describe the data source device (e.g. make and model, orientation) and/or its precise location. For consumer devices, the supplemental data might include the users'/owners' age, gender, income, preferences, or other personal demographic data. See FIG. 6 for an example of data from a hypothetical supplemental data listing the consumer as female.

In some embodiments, a data source device sends data to a network node (e.g., 114). In some embodiments, that node (e.g., 114) is the trusted processing environment (e.g., is sent data directly). In some embodiments, the network node (e.g., 114, 122a) receives the data source device query response data, and then forwards it to the trusted processing environment. In some embodiments, a node is an access point (e.g., 122a). In some embodiments, a network node (e.g., 110, 112, 114) determines (e.g., the best, the closest, the fastest, or the like) the trusted processing environment to be used (e.g., and forwards AreaIDs to the processing environment, and/or instructs other nodes (e.g., access points, such as 122a) to forward AreaIDs to the processing environment).

Upon receiving responses (e.g., AreaID data arrays) from appropriate data source devices in the geospatial area unit, a node (e.g., 122a; 114) transmits the response data to one or more trusted processing environments (e.g., 116) for processing as requested in the request, to create the requested analytical data (e.g., prediction and/or inference) from the data source device data. For example, the resulting AreaIDs are uploaded via wired or wireless link (e.g., LTE, WiFi, and/or 5G) to a trusted processing environment(s) (e.g., an edge and/or cloud computing facility) for processing. In some embodiments, a determination is made as to best trusted processing environment(s) for processing. In some embodiments, considerations for identifying the best trusted processing environment(s) include one or more of distance, bandwidth, and utilization. Notably, the specifics of the one or more processes for selecting the best processing facility is not necessary for understanding the techniques herein, and thus are not described in more detail.

In some embodiments, upon receiving the data source device response data (e.g., AreaIDs), a trusted processing environment (e.g., one or more nodes) merges the data with other data (e.g., AreaIDs) that shares the same request identifier (e.g., PingID). In some embodiments, AreaIDs received outside the specified request timeout value (e.g., Max.Time) in the request (e.g., PingID) are deleted from the trusted processing environment.

In this example, the resulting merged set of AreaID arrays are processed at the trusted processing environment to make predictions (e.g., a prediction of a future temperature change) and/or inferences (e.g., inferring whether a door has been left open, or that people are exercising), for example, using one or more a statistical model. In some embodiments, the statistical model and output variable are specified by the request, as described above. For example, supported statistical model types can include one or more of regression, machine learning, and/or artificial intelligence. Notably, the particular statistical model used (e.g., and whether such statistical model is open source (e.g. generalized least squares) or proprietary to the end user) is not necessary for understanding the techniques herein, and is not described in more detail. Any appropriate statistical model can be used, and any output (e.g., analytical data, such as a variable) can be requested. Of course, consideration should be made that the output variable returned to the end user does not include information that can be used to uniquely identify a given data source device, or information associated therewith (e.g., precise location, user identity, etc.).

In some embodiments, the statistical model is applied to the data in a containerized environment to prevent contamination. For example, the trusted processing environment is a containerized environment (e.g., an environment that uses a containerization engine, such as Docker or Kubernetes). Notably, the specific process to containerize algorithms in a processing environment (e.g., at the edge or in the cloud) can be achieved in many ways, and is not essential to the understanding the techniques described herein, and thus is not described in more detail.

In some embodiments, after the statistical model (e.g., one or more algorithm) is applied, one or more resulting outputs (e.g., analytical data such as inferences and/or predictions) is returned (e.g., via wired or wireless connection; as one or more data packets) to the requester (e.g., to a device of the end user). As one of skill would appreciate, the format of the resulting output data can take many forms, the specifics of which are not essential to understanding of the techniques described herein, and thus are not described in more detail.

In some embodiments, subsequent to sending the requested analytical data to the originating end user, the data source device data (e.g., AreaIDs) associated with the request (e.g., PingID) is deleted from the trusted processing environment (e.g., from the edge and/or cloud environment). For example, trusted processing environment 116 can receive AreaIDs from the data source devices shown in FIG. 4 that satisfy the request and meet criteria and are located within AREA B, devices 410*b*, 410*c*, 410*d*, and 410*g*. After processing the data from the data source devices, trusted processing environment 116 causes the data from the data source devices (e.g., the input data to the process of creating the inference and/or prediction) to be deleted (e.g., from being stored in the trusted processing environments nodes, devices, storage, and the like). The specific mechanism of this deletion can take many forms, the specifics of which are not essential to understanding of the techniques described herein, and thus are not described in more detail.

In some embodiments, a message (e.g., also referred to herein as a "receipt") confirming data deletion is transmitted to the data source devices that shared data. In some embodiments, if, for whatever reason, the receipt cannot be sent to the data source device, the receipt is purged from the trusted processing environment (e.g., cloud and/or edge environment) after a predefined number of milliseconds.

Example Statistical Model Algorithm

In some embodiments, analytical data generation module (also referred to as a statistical model output module) is the main module where statistical models are applied to the data contained within the AreaID packets. In some embodiments, a prediction and/or inference module (e.g., a software program, algorithm, or the like) uses one or more of the following sources of data as input:
1. Data from one or more data source devices (e.g., IoT devices), shared according to local privacy settings. If a consumer opts out of sharing a given field, that data is omitted from the AreaID array. Privacy settings could also potentially disactivate the inclusion of data particular data source devices.
2. Environmental data: data about the one or more data source devices' environment(s), such as its location and orientation.
3. Policies: The analytical data generation process could include configured policies. For example, end users' algorithms can be configured to ignore data from particularly sensitive IoT devices.

An exemplary statistical model algorithm, included as a series of steps, is included below that that could be applied to data source device data to generate a prediction of an optimal audience choice.
1. Let N be a set of possible predictions.
2. Let G be the empty graph.
3. For each element $n_i$ of N:
   a. Add a node $n_i$ to G.
   b. For each node vertix $n_j$
      i. Connect $n_i$ to all node vertices if and only if it is a suitable audience, as determined by an oracle; otherwise, $n_i$ is left unconnected.
      ii. Assign a capacity of $c(n_i, n_j)$ to each edge $(n_i, n_j)$ and assign an existing flow $w(n_i, n_j) <= c(n_i, n_j)$.
4. Add a source S that is connected out to each node in G by an edge with $c(S, \text{infinity}, w(S, n_i)=1$, for all $n_i$ in G.
5. Add a sink node T with edge $(n_i, T)$ for each node $n_i$ in G\S; the capacity of each edge should be $\max(c(n_j, n_i))$.
6. Solve for maximum flow, such as by applying the Ford-Fulkerson algorithm.
7. Output the solved flow, which is the optimal audience choice. (Note: flows must be non-negative, as there is no optimal solution for negative flows without DAGs.)

In some embodiments, a statistical model algorithm module outputs a numerical value. In some embodiments, a statistical model algorithm module outputs a text-based value. In some embodiments, a statistical model algorithm module outputs a image-based value. These values can be derived using a variety of statistical approaches, including regression, machine learning, and/or artificial intelligence.

Example Data Formats

Turning to FIG. 6, it illustrates several example data formats of data source device response data (e.g., AreaID) that can be transmitted, in response to receiving a ping (e.g., PingID), from a data source device to a node (e.g., 114) for processing (e.g., by a trusted processing environment). This section gives examples of the required data. The data are represented as XML objects, but they could be represented as JSON or other formats. In the examples described below, the data sample comes from a female end user with a heartrate monitor entering a bookstore, which has a sound monitor installed. Note that these are non-exhaustive in terms of content of data within a message.

Data object 602 represents a message from an IoT device that is a footfall sensor, and includes sender information (device@example.org), addressee information (client@example.org), location information (latitude, longitude), timestamp information, data type information (e.g., 'Footfall' describing the type of data being from a footfall sensor) and data details (e.g., 45 beats per minute (BPM)).

Data object 604 represents a message from anIoT device that is a decibel meter, and includes sender information (device@example.org), addressee information (client@example.org), timestamp information, data type information (e.g., 'Sound' describing the type of data being from a decibel meter) and data details (e.g., 87 Decibels).

Data object 606 represents a message from a user device (e.g., a smartphone) that includes supplemental demographic information. Data object 606 includes sender information (device@example.org), addressee information (client@example.org), timestamp information, data type information (e.g., 'Gender' describing the type of data being gender data) and data details (e.g., value=F (for female)).

The data format of a request and/or a query/ping (e.g., PingID) can be similar to as shown above for data objects 602, 604, and 606. For example, they can include fields for specifying one or more of: one or more types of output data, one or more statistical models, one or more geospatial area units, and other criteria.

Figure 7:
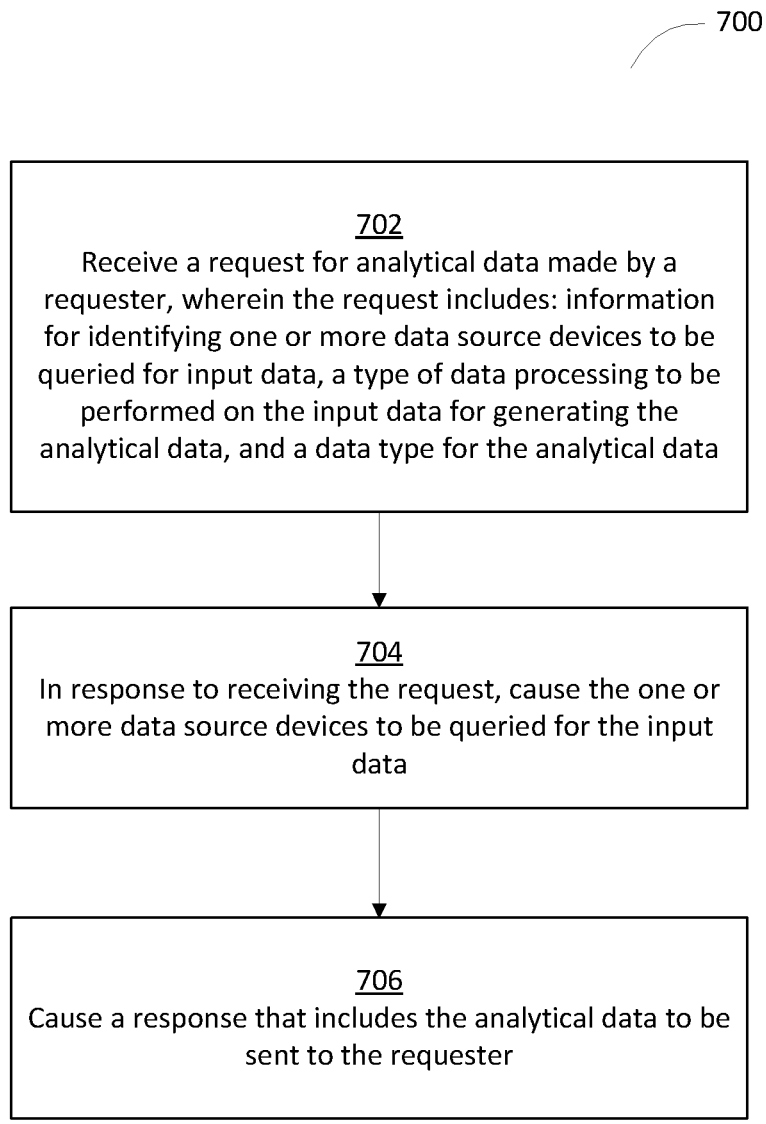
FIG. 7 an exemplary process for in accordance with some embodiments.

FIG. 7 illustrates an exemplary process 700 for obtaining data from one or more data source devices, based on a request, for protecting data source device privacy in accordance with some embodiments. Process 700 can be performed by one or more system (e.g., of one or more devices) as described herein (e.g., 110, 112, 114, 122*a*-122*c*, 1004, 1006, 1008*a*-1008*n*, 1106, 1160*b*, 1300, 1412*a*-1412*c*, 1414, 1420, 1430, 1510, 1520). The techniques and embodiments described with respect to process 700 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process.

At block 702, the system (e.g., one or more of 110, 112, 114) receives (e.g., from a requester; from another node (e.g., forwarding from the requester) (e.g., 112)) a request (e.g., 103) for analytical data (e.g., a prediction, an inference) made by a requester (e.g., 102), wherein the request includes: information for identifying one or more data source devices to be queried for input data (e.g., one or more geospatial area unit), a type of data processing to be performed on the input data for generating the analytical data (e.g., one or more statistical model (used to generate a prediction and/or an inference)), and a data type (e.g., a prediction, an inference) for the analytical data.

At block 704, in response to receiving the request, the system (e.g., 110, 112, 114) causes the one or more data source devices (e.g., 126a-126f) to be queried (e.g., sent the PingID of the request) for the input data (e.g., by forwarding the request (e.g., as a PingID) to a node (e.g., 122a, 122b, 122c) (e.g., a base station) associated with the area unit, or forwarding request directly to the data source devices). For example, the node 114 transmits a PingID for the request to base stations 122a-122c associated with the data source devices, or otherwise causes another node (e.g., 112) to transmit the PingID to the base stations.

At block 706, the system causes a response that includes the analytical data (e.g., the output that includes prediction and/or an inference) to be sent (e.g., by the node performing the method, or by another node) to the requester (e.g., 102).

In some embodiments, the system (e.g., 110, 112, 114) causes input data (e.g., one or more AreaIDs) (e.g., 602, 604, 606) (e.g., data used as input into the statistical model(s)) returned by the one or more data source devices (e.g., 126a-126f) in response to being queried to be processed in a trusted processing environment (e.g., 116) (e.g., by the best edge and/or cloud computing facility) in accordance with the type of data processing specified in the request in order to generate the analytical data. For example, node 114 forwards the AreaIDs from devices 126a-126f to trusted processing environment 116.

In some embodiments, causing the input data (e.g., AreaIDs) returned by the one or more data source devices (e.g., 126a-126f) in response to being queried to be processed in the trusted processing environment (e.g., 116) includes the system (e.g., 110, 112, 114) causing the input data returned by the one or more data source devices to be deleted from the trusted processing environment at the completion of processing (e.g., causing via one or more messages or commands configuring processing on the trusted computing environment) (e.g., at the completion of processing can mean one of the following: after generation of the analytical data; after the generated analytical data is sent to a network node (e.g., that requested the processing); after the generated analytical data is sent to the requester).

In some embodiments, the system (e.g., 110, 112, 114) causes a confirmation to be sent to each respective data source device of the one or more data source devices confirming that its respective returned input data was deleted from the trusted processing environment. For example, each data source device (e.g., 126a-126f) that returned input data in response to the query for input data receives a confirmation that its returned input data has been deleted (e.g., deleted from the trusted processing environment and/or deleted from the node (e.g., 114) that initiated processing by the trusted processing environment (e.g., 116)).

In some embodiments, the trusted processing environment (e.g., 116), for processing the input data returned by the one or more data sources (e.g., 126a-126f), is a containerized processing environment. (e.g., a containerized application executing on host node/system/device that is isolated from other processes/applications. For example, this can prevent contamination of the input or output data, and prevent unauthorized access to such data in order to maintain privacy).

In some embodiments, the response (e.g., 128) that includes the analytical data that is sent (e.g., by a node of network 110, such as 114) (e.g., by the trusted computer environment, such as 116) to the requester (e.g., 102) does not include data allowing the requester to uniquely identify each of the one or more data source devices (e.g., 126a-126f). For example, the prediction or inference output provided to the requester after processing by the trusted processing environment does not include information that can be used to uniquely identify the data source devices whose information was used in the processing.

In some embodiments, the request (e.g., 103) for analytical data includes a request timeout value (e.g., a maximum wait time), and wherein input data (e.g., AreaID) returned by the one or more data source devices after expiration of the request timeout value is excluded from processing performed for generating the analytical data (e.g., is ignored or discarded after being received). In some embodiments, input data returned by a data source device includes a timestamp (e.g., indicating a time when the data source device transmitted the input data to the querying node). For example, if the timestamp represents a time that is more than the maximum wait time after some initial time (e.g., a first timestamp representing the time when the query (e.g., ping, request) was sent), then the returned input data is ignored or discarded) for the purposes of generating the analytical data. In some embodiments, if the returned input data is received by the querying node after the timeout value expires, the returned input data is excluded from processing (e.g., no timestamp is inserted by the querying node, but the input data must be received by the querying node by a certain time in order to be included).

In some embodiments, the type of data processing to be performed on the input data for generating the analytical data includes processing the input data using one or more of: an algorithm, a machine learning model, an artificial intelligence model, and a statistical model.

In some embodiments, the system (e.g., 110, 112, 114) causes a request identifier (e.g., PingID) to be generated (e.g., is generated directly by the system, by a component/node of the system, or by a component/node of a different system) that uniquely identifies the request, wherein the request identifier is provided to the one or more data source devices (e.g., 126a-126f) when the one or more data source devices are queried for the input data based on the request (e.g., the query (or queries) sent to each of the one or more data source devices includes the request identifier (e.g., PingID)). In some embodiments, the unique identifier is included in a data array (e.g., PingID) the also includes an indication of the requested data.

In some embodiments, the information for identifying the one or more data source devices includes a geospatial area unit. In some embodiments, the analytical data (e.g., output inference/prediction) is generated based on a set of input data (e.g., 602, 604, 606) returned by a set of data source devices (e.g., 410b, 410c, 410d, 410e), of the one or more source devices (e.g., all of the devices within the boundary 406 of AREA B in FIG. 4), that are located within the geospatial area unit. In some embodiments, the analytical data is not generated based on input data returned by data source devices, of the one or more source devices, that are not located within the geospatial area unit (e.g., all of the devices not located within the boundary 406 of AREA B in FIG. 4). In some embodiments, a group of devices that do not have a geospatial relationship are indicated in the request using one or more criteria (e.g., all sensors of a particular model) (e.g., so that such devices can be exclusively included, or excluded, from querying or having their response used for generating the output data).

In some embodiments, the system (e.g., 110, 112, 114) causes identification of the one or more data source devices based on the geospatial area unit. For example, the system determines the respective locations of the data source devices to determine which are currently inside of the area unit. In some embodiments, the location determination occurs before the ping/query is sent (e.g., so that the ping is sent only to data source devices located in the geospatial area unit). In some embodiments, the location determination occurs after the ping/query is sent and the location information is returned in the data source device's response (e.g., AreaID includes device location data). For example, the ping can be sent only to those specific data source devices within the geospatial area unit and avoid the ones outside (e.g., which can mean that location of each data source device is determined before sending the ping). As another example, the ping can be sent to a candidate set of devices (e.g., all devices connected to a base station) and discard data from the ones outside that are located outside of the geospatial area unit (e.g., where the base station has a coverage area that is at least partially outside of the geospatial area unit.). Which technique is used can depend, for instance, on the particulars of the geospatial area unit and the arrangement of access point nodes and their coverage areas).

In some embodiments, the system (e.g., 110, 112, 114) causes the request (e.g., 103) to be sent (e.g., as a PingID) (e.g., sends the request, or causes another node to send the request) to one or more network nodes (e.g., 122*a*, 122*b*, 122*c*, 1008*a* . . . 1008*n*) (e.g., cellular base stations, towers, cells; or network access points) identified based on the geospatial area unit (e.g., win the geospatial area unit or serving the geospatial area unit (e.g., with wireless connectivity coverage)), wherein the one or more network nodes have respective geospatial locations that are associated with (e.g., within; near and providing network connectivity service within) the geospatial area unit.

In some embodiments, the request (e.g., 103) includes one or more criteria that defines a subset of the devices within the geospatial area unit (e.g., specifies only a certain type of data source device should be used to process the analytical data).

In some embodiments, the system (e.g., 110, 112, 114) receives input data (e.g., AreaID) (e.g., 602, 604, 606) returned by the one or more data source devices (e.g., 126*a*-126*f*) queried for the input data. In some embodiments, the received input data returned by the one or more data source devices includes supplemental data (e.g., demographic data, such as 606) that is different from the requested data (e.g., temperature). For example, supplemental data can include any data not specifically requested in the query (e.g., data source device model, user demographic information, etc.). For example, the input data includes supplemental demographic information (e.g., make and model and/or orientation of device; owners' age, gender, or income).

In some embodiments, input data (e.g., AreaID) (e.g., 602, 604, 606) returned by each respective data source device (e.g., 126*a*-126*f*) that was queried based on the request (e.g., was sent a query (e.g., PingID) in response to a network node receiving the request), of the one or more data source devices, includes a respective unique identifier for the respective data source device (e.g., each data source device returns a unique identifier with the input data that is returned in response to a query, wherein the unique identifier is unique to each data source device (e.g., each data source device has a different unique identifier).

Figure 8:
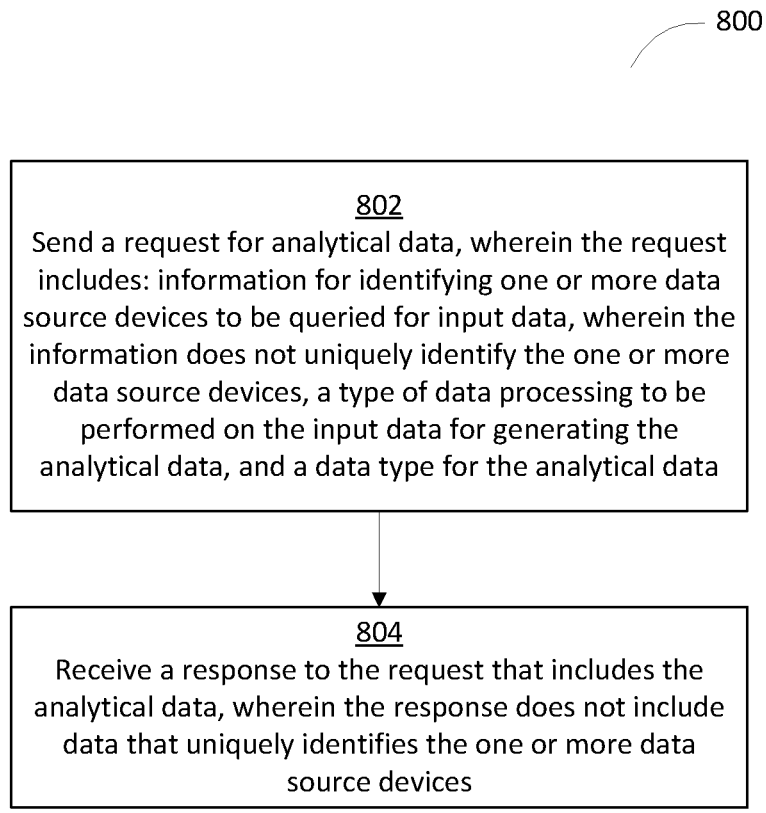
FIG. 8 an exemplary process for in accordance with some embodiments.

FIG. 8 illustrates an exemplary process 800 for obtaining analytical data based on input data from one or more data source devices for protecting data source device privacy in accordance with some embodiments. Process 800 can be performed by one or more system (e.g., of one or more devices) as described herein (e.g., 102, 1002, 1430, 1510). The techniques and embodiments described with respect to process 800 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process.

At block 802, the system (e.g., 102) sends a request (e.g., 103) for analytical data (e.g., a prediction, an inference), wherein the request includes: information (e.g., a geospatial area unit) for identifying one or more data source devices (e.g., 126*a*-126*f*) to be queried for input data (e.g., AreaID), wherein the information does not uniquely identify the one or more data source devices (e.g., does not include information that directly identifies a specific device or user, such as a device address or unique identifier, or user profile or identity associated with the device), a type of data processing to be performed on the input data for generating the analytical data (e.g., one or more statistical model (used for a prediction and/or an inference)), and a data type for the analytical data (e.g., a prediction, an inference). In some embodiments, the information for identifying the one or more data source devices includes one or more characteristics (e.g., a geospatial area unit) that can be used to determine one or more devices that meet the one or more characteristics. However, the one or more characteristics alone do not necessarily reveal data source device identity, nor is such identity required in order to specify such characteristics for the purposes of requesting input data. For example, the requester can specify a characteristic (e.g., a geospatial area unit), and even if only one data source device meets that characteristic, the requester is not required to have any knowledge of that data source device other than the characteristic specified in order to request input data (e.g., a receive back analytical data based the input data).

At block 804, the system (e.g., 102) receives (e.g., from 110, 112, 114, 116) a response (e.g., 128) to the request (e.g., 103) that includes the analytical data (e.g., output of the statistical model algorithm), wherein the response does not include data that uniquely identifies the one or more data source devices (e.g., 126*a*-126*f*).

In some embodiments, the request (e.g., 103) for analytical data includes a request timeout value (e.g., a maximum wait time), and wherein input data returned by the one or more data source devices (e.g., 126*a*-126*f*) after expiration of the request timeout value is excluded from processing performed for generating the analytical data.

In some embodiments, the information for identifying the one or more data source devices (e.g., 410b, 410c, 410d, 410e) includes a geospatial area unit (e.g., defined by boundary 406 of AREA B in FIG. 4), wherein the analytical data is generated based on a set of input data returned by a set of data source devices (e.g., 410b, 410c, 410d, 410e), of the one or more source devices, that are located within the geospatial area unit, and wherein the analytical data is not generated based on input data returned by data source devices, of the one or more source devices, that are not located within the geospatial area unit (e.g., all of the devices not within the boundary 406 of AREA B in FIG. 4).

In some embodiments, the information for identifying the one or more data source devices includes selection criteria (e.g., a characteristic of a device), and wherein a respective data source device must meet the selection criteria for its respective returned input data to be used for processing to generate the analytical data. For example, selection criteria can include a device model, a device software or firmware version, a type of device (e.g., smartphone, IoT sensor), or the like. For instance, in FIG. 4, device 410f, though included in AREA B, is excluded from meeting the selection criteria based on additional criteria other than being located in the geospatial area unit of AREA B.

In some embodiments, the type of data processing to be performed on the input data for generating the analytical data includes processing the input data using one or more of: an algorithm, a machine learning model, an artificial intelligence model, and a statistical model.

In some embodiments, the request (e.g., 103) includes a request identifier that uniquely identifies the request, wherein the request identifier is included in a query for the input data to the one or more data source devices sent based on the request. For example, the query (or queries) sent to each of the one or more data source devices includes the request identifier (e.g., in a PingID). In some embodiments, the requester (e.g., 102) generates the request identifier (e.g., before sending the request). In some embodiments, a network node (e.g., 114) generates the request identifier (e.g., after receiving the request).

In some embodiments, wherein sending the request (e.g., 103) for analytical data includes sending the request to one or more nodes (e.g., 122a, 122b, 122c) in a network of nodes associated with the one or more data source devices (e.g., 126a-126f). In some embodiments, a node is a cellular base station, tower, cell, or wireless access point. In some embodiments, a node associated with the one or more data source devices is a node connected to (e.g., wirelessly, such as via cellular (e.g., 3G, 4G LTE, 5G NR) and/or via WiFi, or the like) a data source device (e.g., 126a) of the one or more data source devices).

In some embodiments, the response (e.g., 128) to the request (e.g., 103) that includes the analytical data (e.g., statistical model output) does not include data allowing the requester to uniquely identify each of the one or more data source devices (e.g., 126a-126f) (e.g., the response includes only generalized data).

In some embodiments, the request is scheduled and/or automatically generated.

Figure 9:
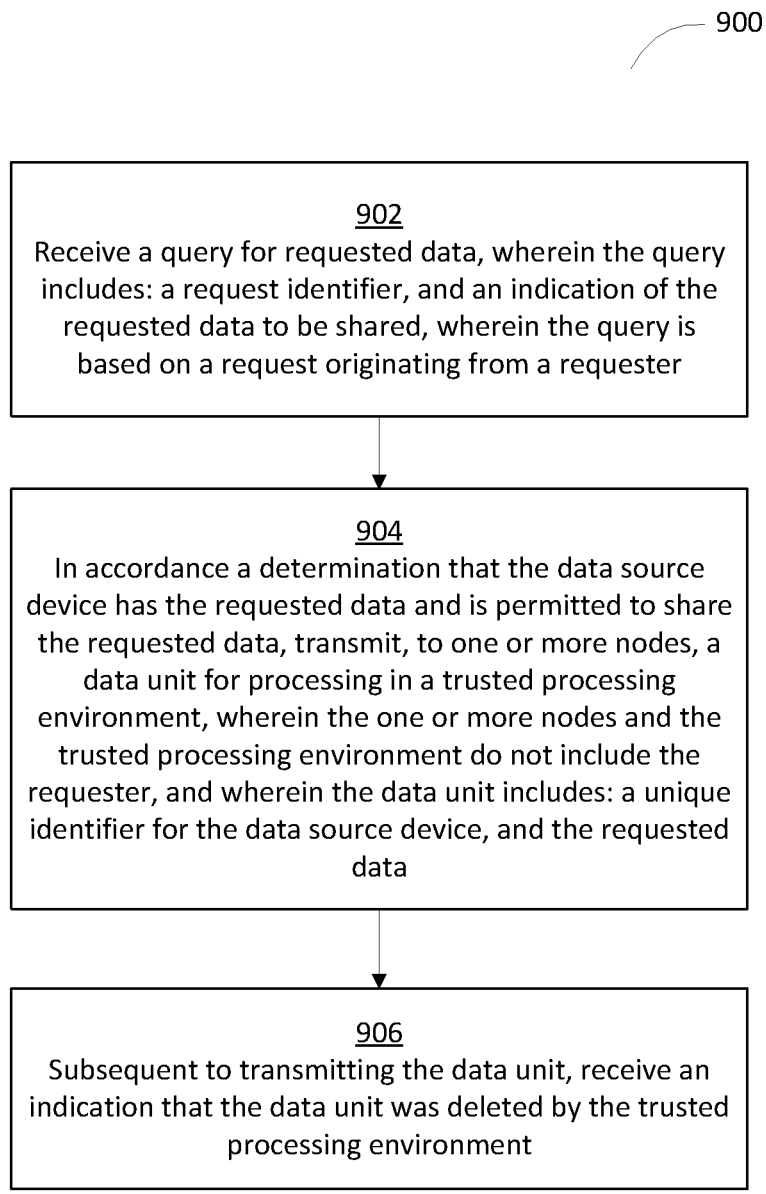
FIG. 9 an exemplary process for in accordance with some embodiments.

FIG. 9 illustrates an exemplary process 900 for responding to a query for data in accordance with some embodiments. Process 900 can be performed by one or more system (e.g., of one or more devices) as described herein (e.g., one or more of 126a-126f, 410a-410h, 510, 518, one or more of 1010a-1010n, 1012a-1012n, 1110b, 1110c, 1200, 1491, 1492, 1530). The techniques and embodiments described with respect to process 900 can be performed or embodied in a computer-implemented method, a system (e.g., of one or more devices) that includes instructions for performing the process (e.g., when executed by one or more processors), a computer-readable medium (e.g., transitory or non-transitory) comprising instructions for performing the process (e.g., when executed by one or more processors), a computer program comprising instructions for performing the process, and/or a computer program product comprising instructions for performing the process.

At block 902, the system (e.g., a data source device) (e.g., 126a) receives (e.g., from a requester device (e.g., 102), from a node (e.g., 122a, 114) (e.g., cellular base station, tower, or cell)) a query (e.g., a ping, a PingID) for requested data (e.g., input data (sensor data, demographic data)), wherein the query includes: a request identifier (e.g., unique identifier for the request/PingID), and an indication of the requested data (e.g., temperature, location, velocity, etc.) to be shared, wherein the query is based on a request (e.g., 103) originating from a requester (e.g., 102).

At block 904, in accordance a determination that the data source device (e.g., 126a) has the requested data (e.g., temperature) and is permitted to share the requested data (e.g., user of 126a has opted into sharing such data), the system transmits, to one or more nodes (e.g., 122a, 114) (e.g., in a network of nodes, such as a cellular network comprising a plurality of nodes the process and/or route data), a data unit (e.g., an AreaID, a data array) (e.g., 602, 604, 606) for processing in a trusted processing environment (e.g., 116). In some embodiments, the one or more nodes and the trusted processing environment do not include the requester (e.g., 102). In some embodiments, the data unit includes: a unique identifier (e.g., randomly generated alphanumeric string) for the data source device, and the requested data (e.g., can also include the request identifier (e.g., PingID)).

At block 906, subsequent to transmitting the data unit, the system receives (e.g., from 122a, 114, 116) an indication that the data unit (e.g., temperature data) (e.g., 602, 604, 606) was deleted by the trusted processing environment (e.g., 116) (e.g., whether it was used or not (timeout value exceeded)).

In some embodiments, in accordance with a determination that the system (e.g., 126a) does not have the requested data (e.g., temperature), the system (e.g., 126a) transmits an empty data unit (e.g., AreaID without temperature data) that includes the unique identifier (e.g., alphanumeric string) but that does not include the requested data. (e.g., includes an empty data array and/or some notification that the data source device does not have the requested data).

In some embodiments, prior to receiving the query (e.g., PingID) for requested data, the system (e.g., 126a) receives an indication of one or more types of data permitted to be shared by the data source device. For example, the data source device 126a receives user input opting into (or out of) sharing particular types of data.

In some embodiments, in accordance a determination that the system is not permitted to share the requested data, the system (e.g., 126a) ignores the query. In some embodiments, ignoring the query comprises forgoing transmitting a response (e.g., data unit, AreaID).

In some embodiments, the data unit (e.g., AreaID, a data array) (e.g., 602, 604, 606) includes supplemental data (e.g., supplemental demographic information (e.g., make and model and/or orientation of device; owners' age, gender, income) that is different than the requested data. For example, the requested data is temperature, and the supplemental data is device model number.

Figure 10:
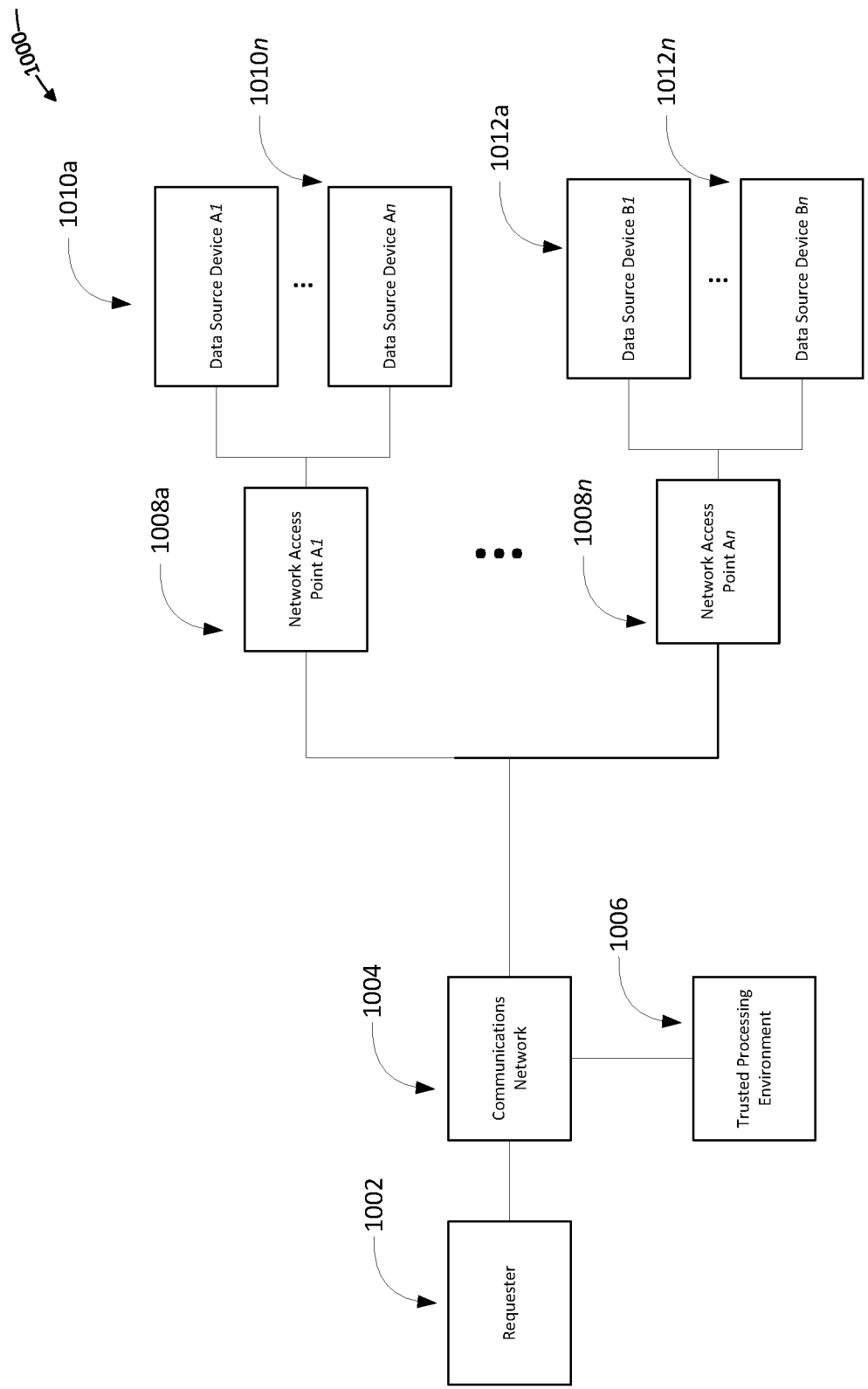
FIG. 10 illustrates an exemplary architecture of functional blocks in accordance with some embodiments.

FIG. 10 illustrates an exemplary block diagram of functional blocks of an exemplary architecture 1000 (e.g., a system of a plurality of devices) in accordance with some embodiments. The blocks in FIG. 10 are described with respect to their general functions, and it should be understood that each individual block can be performed by one or more devices or systems, and/or that the blocks within network 1000 can be rearranged and/or combined in any fashion while still performing the same or substantially similar functions, which is intended to be within the scope of this disclosure.

Block 1002 represents a requester (e.g., similar or the same as described with respect to 102). Block 1004 represents a communications network (e.g., similar or the same as described with respect to 110). For example, block 1004 can represent one or more public or private networks usable to connect a requester with data source devices. Block 1004 can be one of, or a combination of more than one of, a public, private or hosted network; it can be a backbone network or the Internet; and it can comprise two or more sub-networks. Block 1004 can represent one or more nodes (e.g., 110, 112, 114) that form part of, or are otherwise connected to, the communications network and used to handle requests (e.g., PingIDs) and responses (e.g., AreaIDs).

Block 1006 represents a trusted processing environment (e.g., similar or the same as described with respect to 116). In some embodiments, a trusted processing environment is part of a node within the communications network represented by block 1004. As described herein throughout, a trusted processing environment can be used to process requester requests based on data source device data.

Blocks 1008a through 1008n represent a number of network access points (e.g., similar or the same as described with respect to 122a-122c) that connect one or more data source devices with the communications network and/or the trusted processing environment. For example, a network access points A1 through An can be cellular base stations.

Blocks 1010a through 1010n and blocks 1012a through 1012n represent data source devices (e.g., smartphones, sensors, IoT devices) (e.g., similar or the same as described with respect to 126a-126f) that are connected to the communications network via respective network access points.

Figure 11:
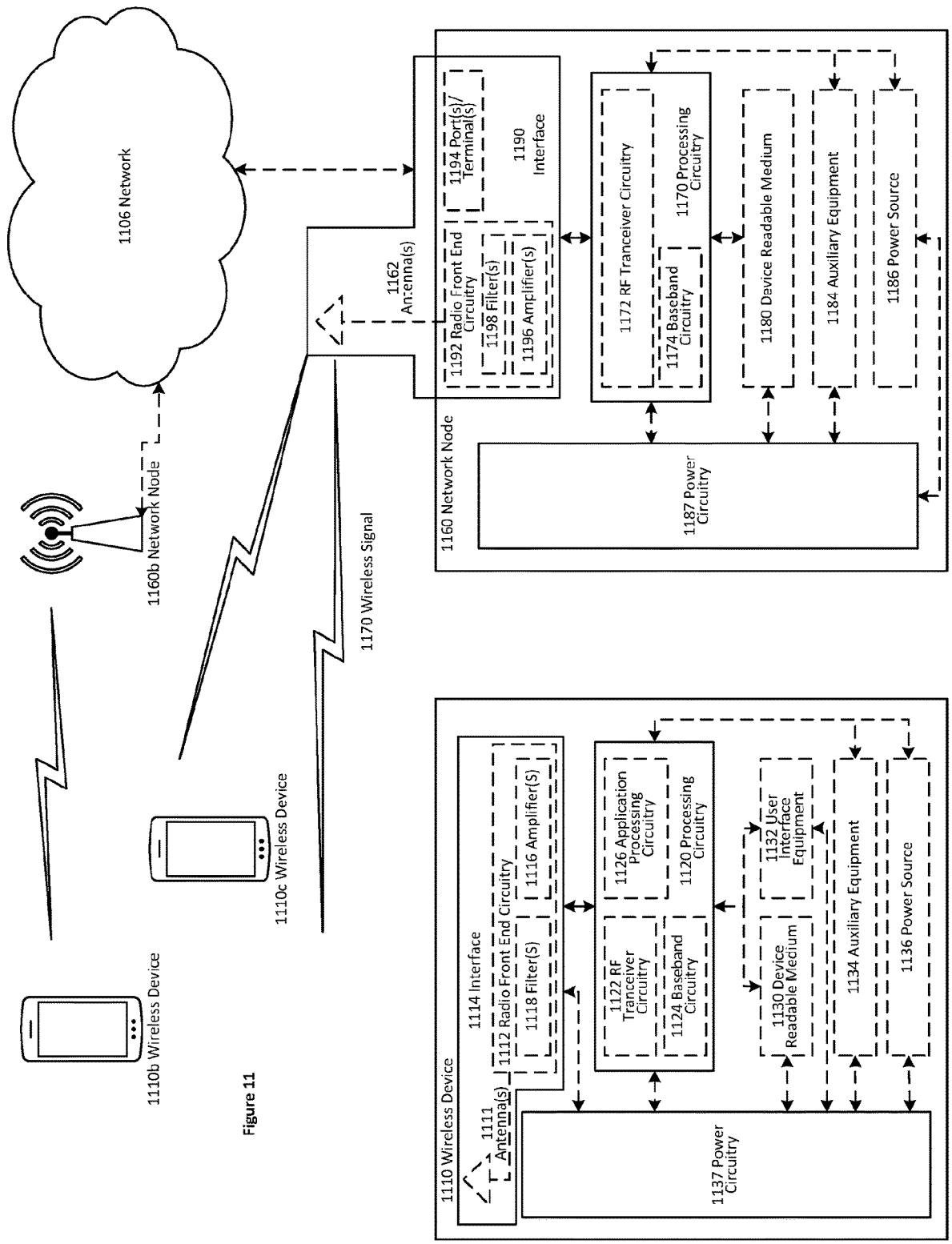
FIG. 11 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
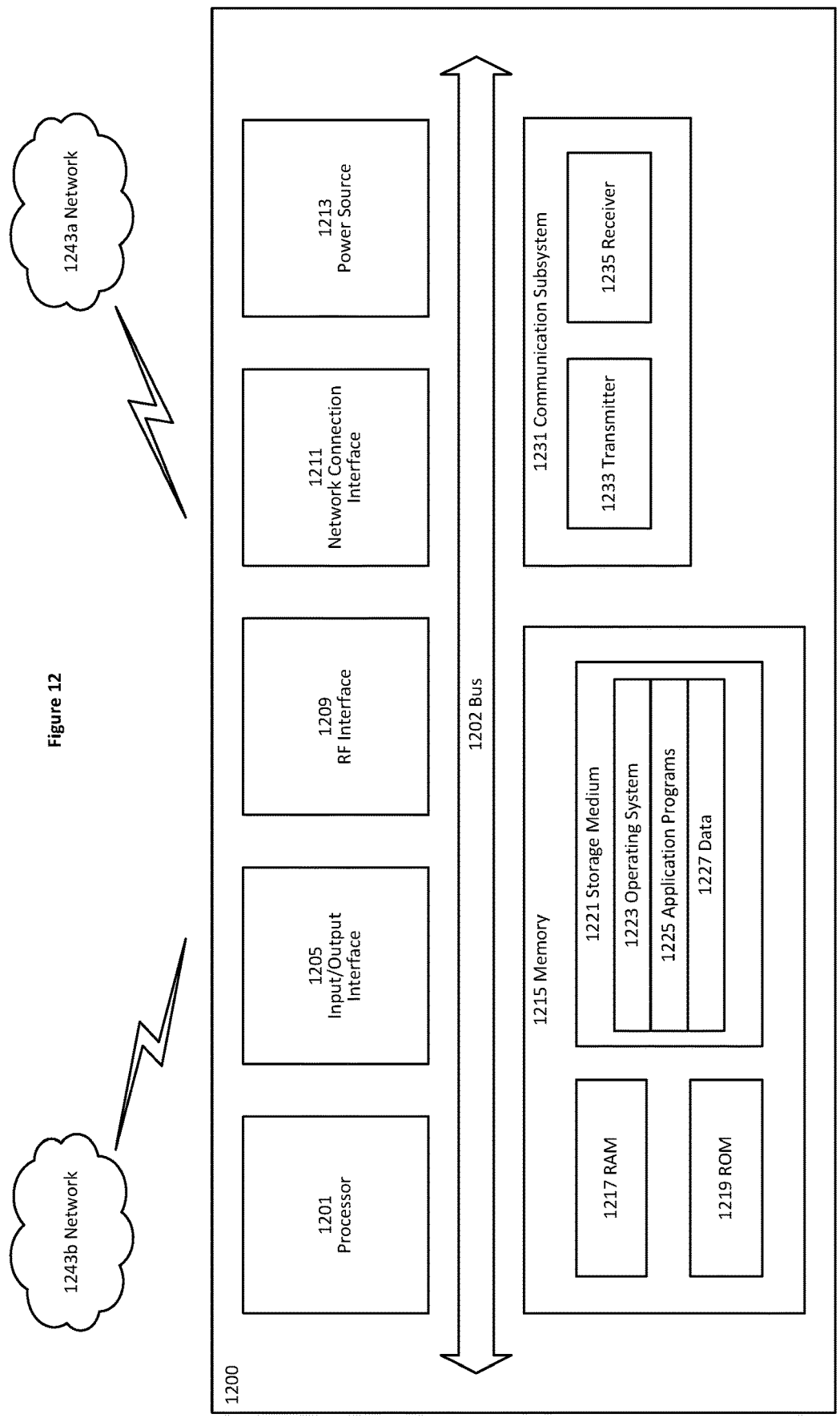
FIG. 12 illustrates User Equipment in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
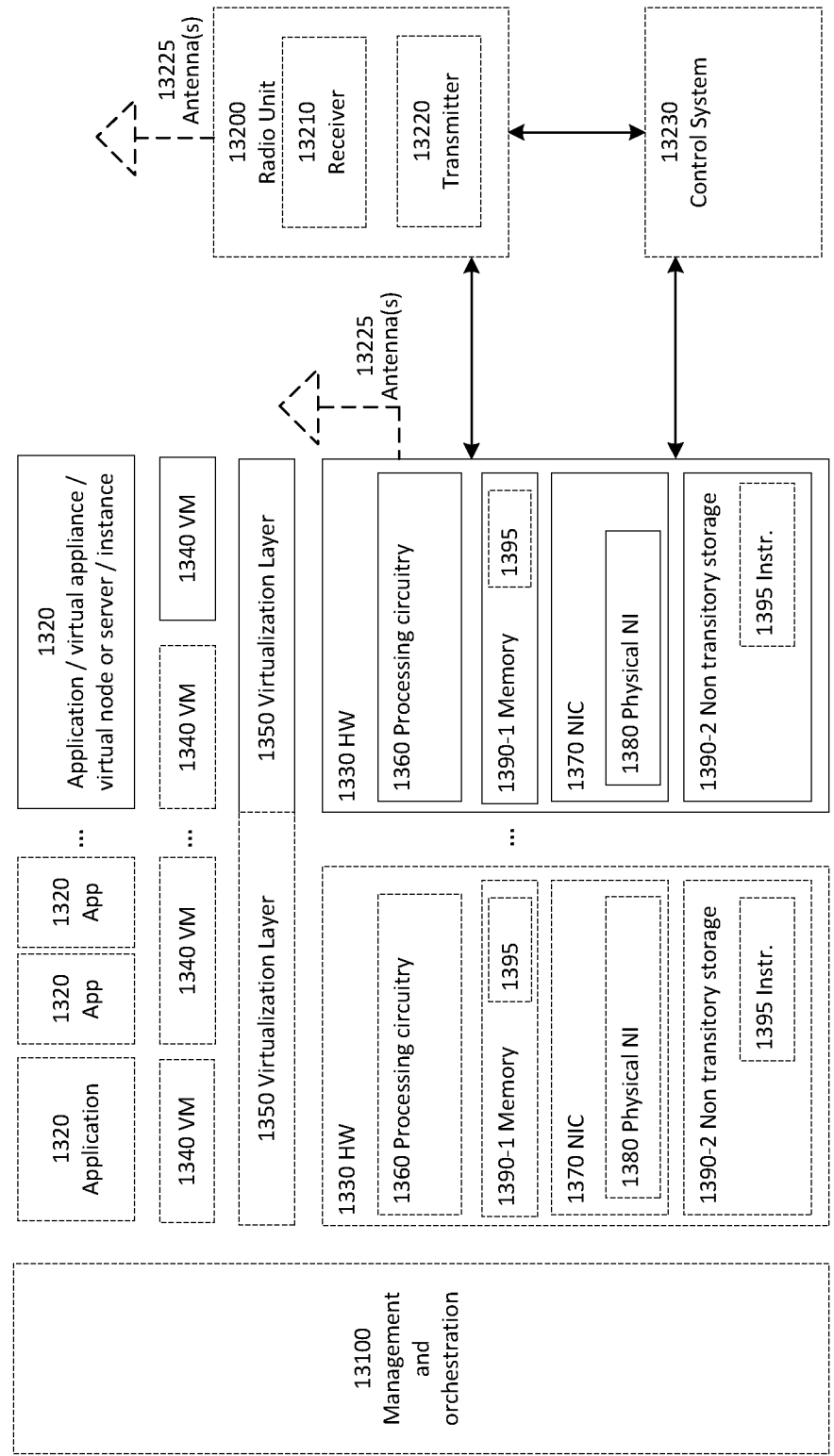
FIG. 13 illustrates a virtualization environment in accordance with some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
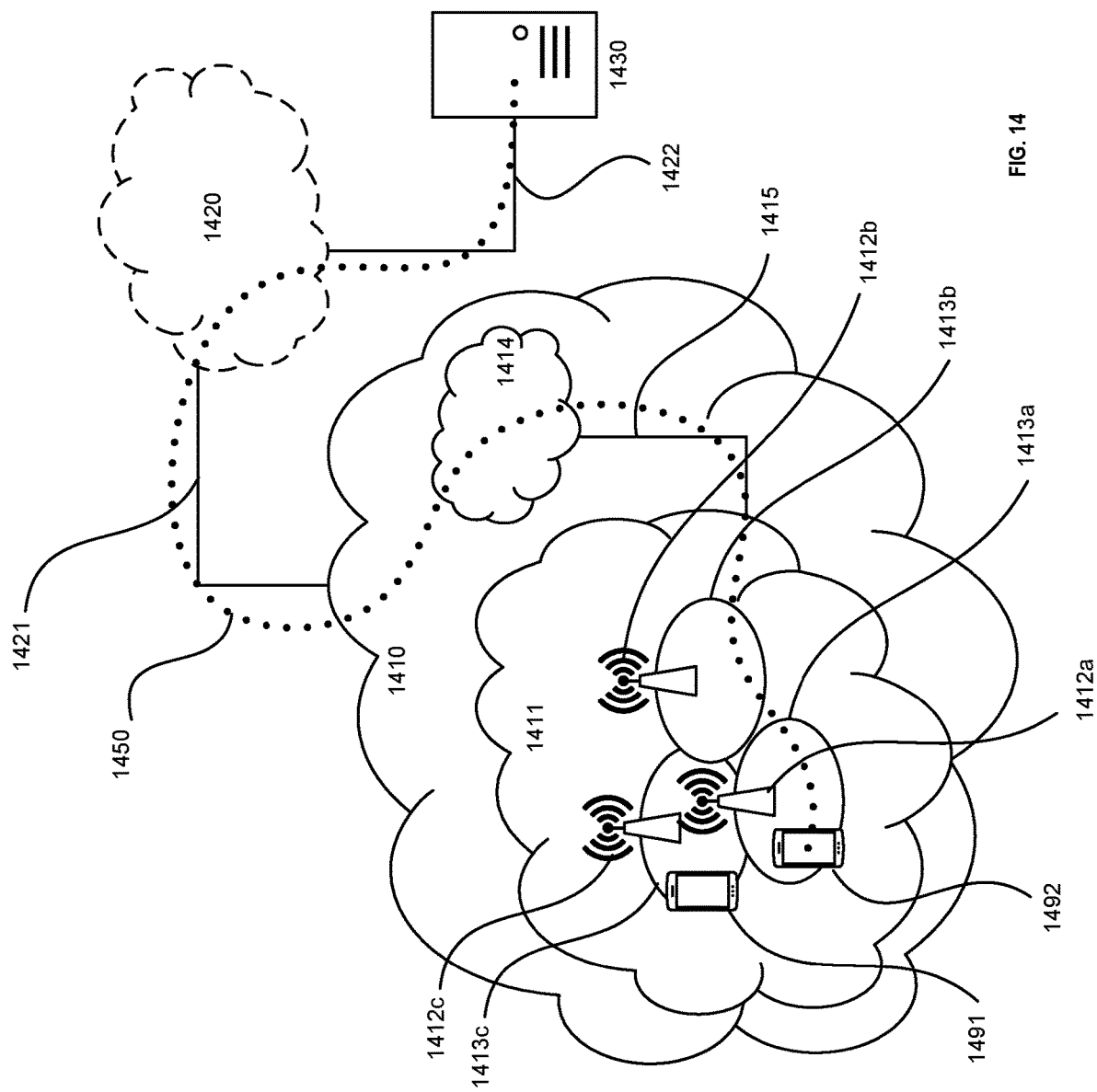
FIG. 14 illustrates a telecommunication network connected via an intermediate network to a host computer in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

Figure 15:
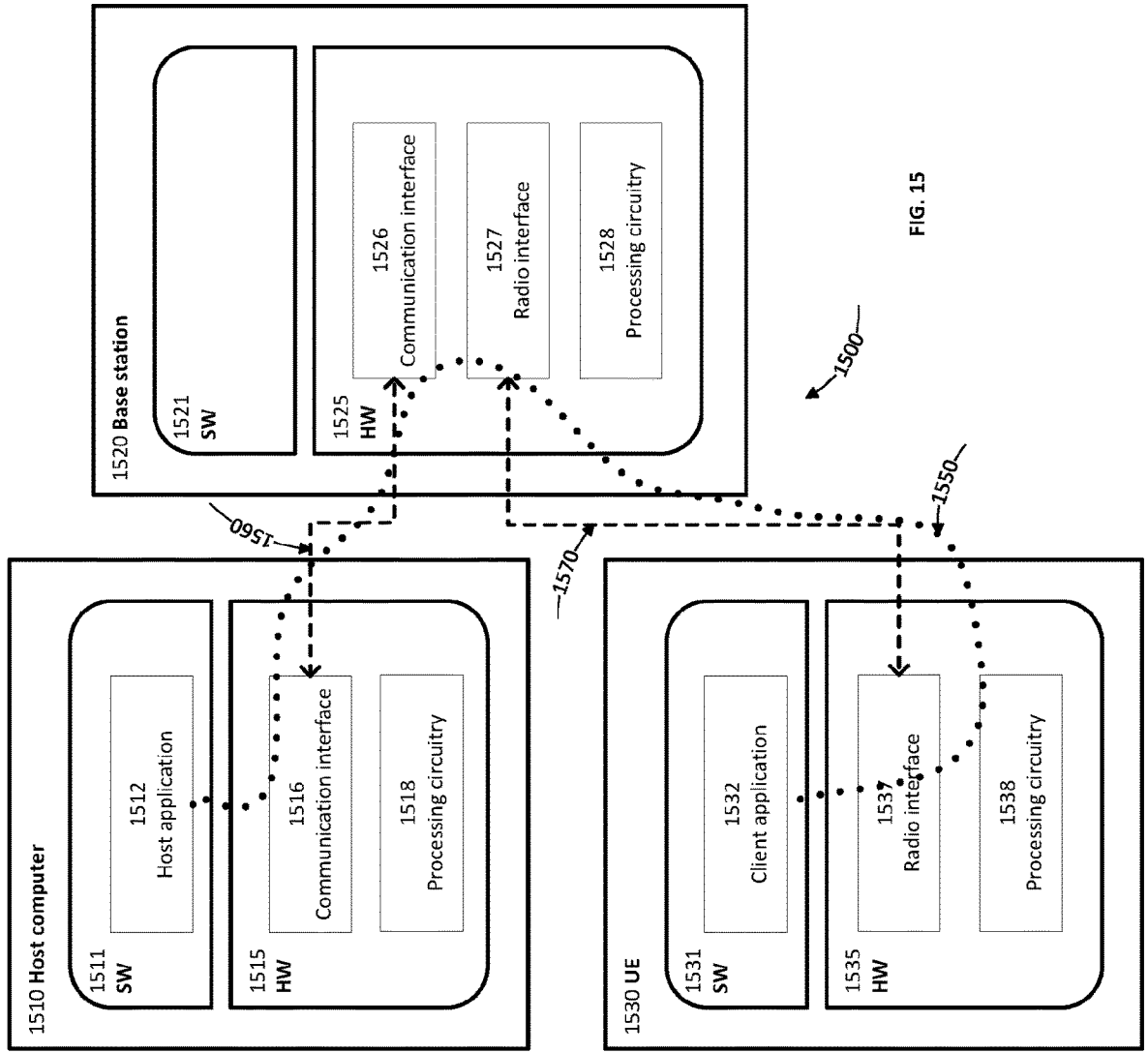
FIG. 15 illustrates a host computer communicating via a base station with a user equipment over a partially wireless connection in accordance with some embodiments.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

The invention claimed is:

1. A computer-implemented method for obtaining data from one or more data source devices, based on a request, for protecting data source device privacy, comprising:
   receiving a request for analytical data made by a requester, wherein the request includes:
      information for identifying one or more data source devices to be queried for input data,
      a type of data processing to be performed on the input data for generating the analytical data, and
      a data type for the analytical data;
   in response to receiving the request, causing the one or more data source devices to be queried for the input data;
   receiving input data returned by the one or more data source devices queried for the input data;
   causing input data returned by the one or more data source devices in response to being queried to be processed in a trusted processing environment in accordance with the type of data processing specified in the request in order to generate the analytical data; and
   causing a response that includes the analytical data to be sent to the requester.

2. The method of claim 1, wherein causing the input data returned by the one or more data source devices in response to being queried to be processed in the trusted processing environment includes causing the input data returned by the one or more data source devices to be deleted from the trusted processing environment at completion of processing.

3. The method of claim 2, further comprising:
   causing a confirmation to be sent to each respective data source device of the one or more data source devices confirming that its respective returned input data was deleted from the trusted processing environment.

4. The method of claim 1, wherein the trusted processing environment, for processing the input data returned by the one or more data sources, is a containerized processing environment.

5. The method of claim 1, wherein the response that includes the analytical data that is sent to the requester does not include data allowing the requester to uniquely identify each of the one or more data source devices.

6. The method of claim 1, wherein the request for analytical data includes a request timeout value, and wherein input data returned by the one or more data source devices after expiration of the request timeout value is excluded from processing performed for generating the analytical data.

7. The method of claim 1, wherein the type of data processing to be performed on the input data for generating the analytical data includes processing the input data using one or more of: an algorithm, a machine learning model, an artificial intelligence model, and a statistical model.

8. The method of claim 1, further comprising:
   causing a request identifier to be generated that uniquely identifies the request, wherein the request identifier is provided to the one or more data source devices when the one or more data source devices are queried for the input data based on the request.

9. The method of claim 1, wherein the information for identifying the one or more data source devices includes a geospatial area unit,
   wherein the analytical data is generated based on a set of input data returned by a set of data source devices, of the one or more source devices, that are located within the geospatial area unit, and
   wherein the analytical data is not generated based on input data returned by data source devices, of the one or more source devices, that are not located within the geospatial area unit.

10. The method of claim 9, further comprising:
    causing identification of the one or more data source devices based on the geospatial area unit.

11. The method of claim 9, further comprising:
    causing the request to be sent to one or more network nodes identified based on the geospatial area unit, wherein the one or more network nodes have respective geospatial locations that are associated with (e.g., within; near and providing network connectivity service within) the geospatial area unit.

12. The method of claim 1, wherein input data returned by each respective data source device that was queried based on the request, of the one or more data source devices, includes a respective unique identifier for the respective data source device.

13. A system for obtaining data from one or more data source devices, based on a request, for protecting data source device privacy, the system comprising one or more processor and memory, said memory containing instructions executable by said one or more processor whereby said system is operative to:
    receive a request for analytical data made by a requester, wherein the request includes:
       information for identifying one or more data source devices to be queried for input data,
       a type of data processing to be performed on the input data for generating the analytical data, and
       a data type for the analytical data;
    in response to receiving the request, cause the one or more data source devices to be queried for the input data;

cause input data returned by the one or more data source devices in response to being queried to be processed in a trusted processing environment in accordance with the type of data processing specified in the request in order to generate the analytical data; and cause a response that includes the analytical data to be sent to the requester.

14. A computer-implemented method for obtaining analytical data based on input data from one or more data source devices for protecting data source device privacy, comprising:

sending a request for analytical data, wherein the request includes:

information for identifying one or more data source devices to be queried for input data, wherein the information does not uniquely identify the one or more data source devices, a type of data processing to be performed on the input data for generating the analytical data, and a data type for the analytical data; and receiving a response to the request that includes the analytical data, wherein the response does not include data that uniquely identifies the one or more data source devices.

15. The method of claim 14, wherein the request for analytical data includes a request timeout value, and wherein input data returned by the one or more data source devices after expiration of the request timeout value is excluded from processing performed for generating the analytical data.

16. The method of claim 14, wherein the information for identifying the one or more data source devices includes a geospatial area unit, wherein the analytical data is generated based on a set of input data returned by a set of data source devices, of the one or more source devices, that are located within the geospatial area unit, and wherein the analytical data is not generated based on input data returned by data source devices, of the one or more source devices, that are not located within the geospatial area unit.

17. The method of claim 16, wherein the information for identifying the one or more data source devices includes selection criteria, and wherein a respective data source device must meet the selection criteria for its respective returned input data to be used for processing to generate the analytical data.

18. The method of claim 14, wherein the request includes a request identifier that uniquely identifies the request, wherein the request identifier is included in a query for the input data to the one or more data source devices sent based on the request.

19. The method of claim 14, wherein sending the request for analytical data includes sending the request to one or more nodes in a network of nodes associated with the one or more data source devices.

20. The method of claim 14, wherein the response to the request that includes the analytical data does not include data allowing the requester to uniquely identify each of the one or more data source devices.

* * * * *